INVENTOR:
JOHN M. WIESE
ATTORNEY

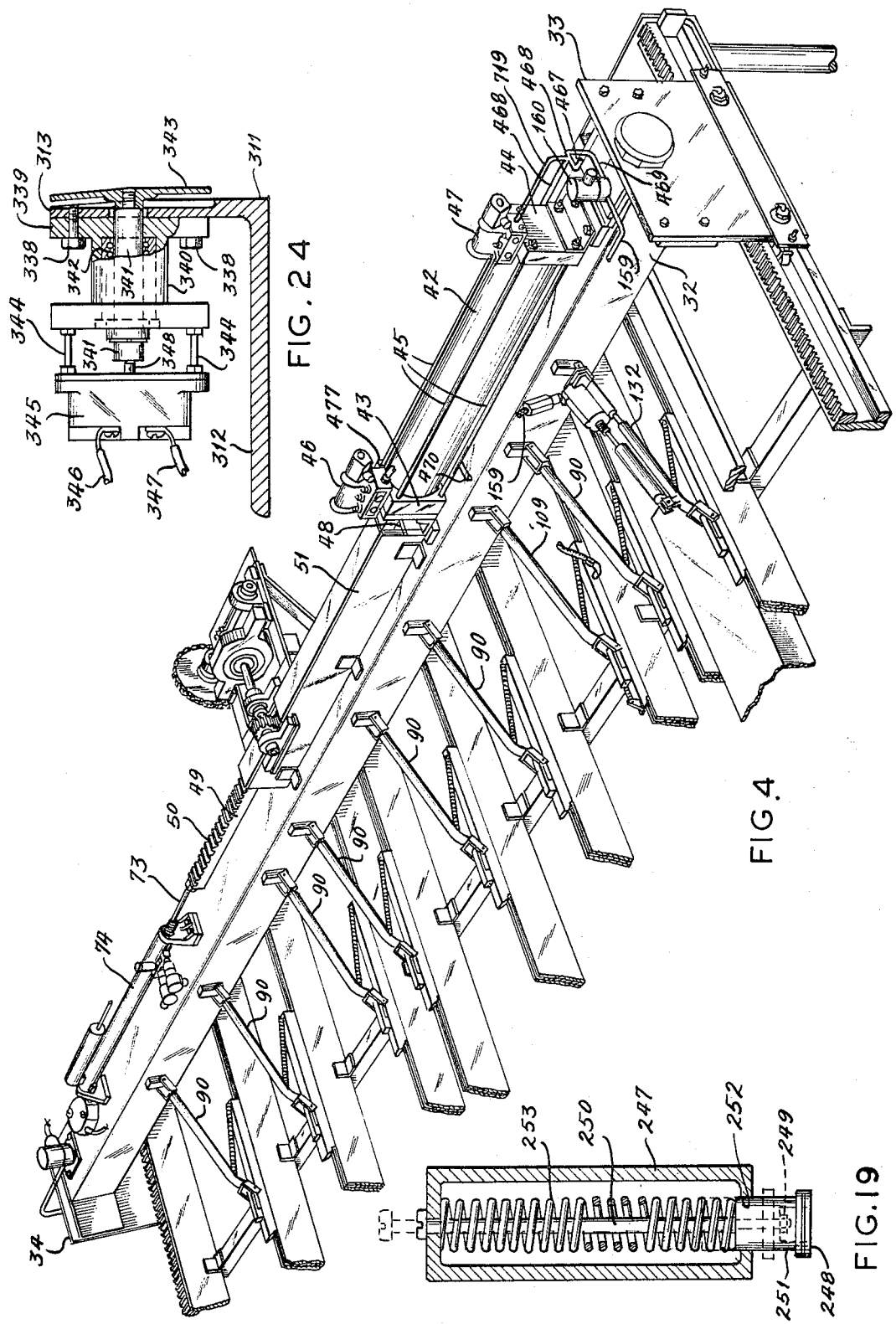

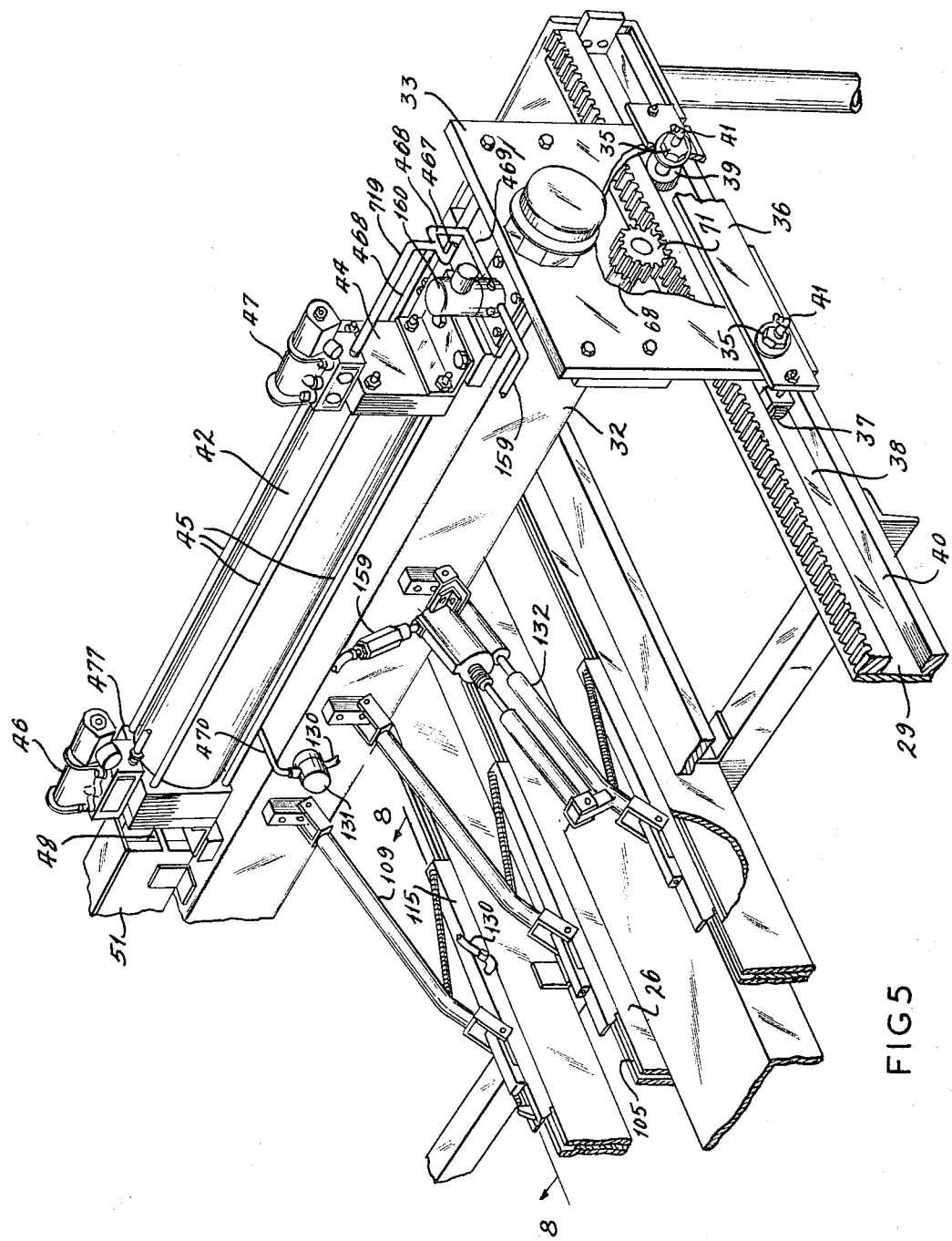

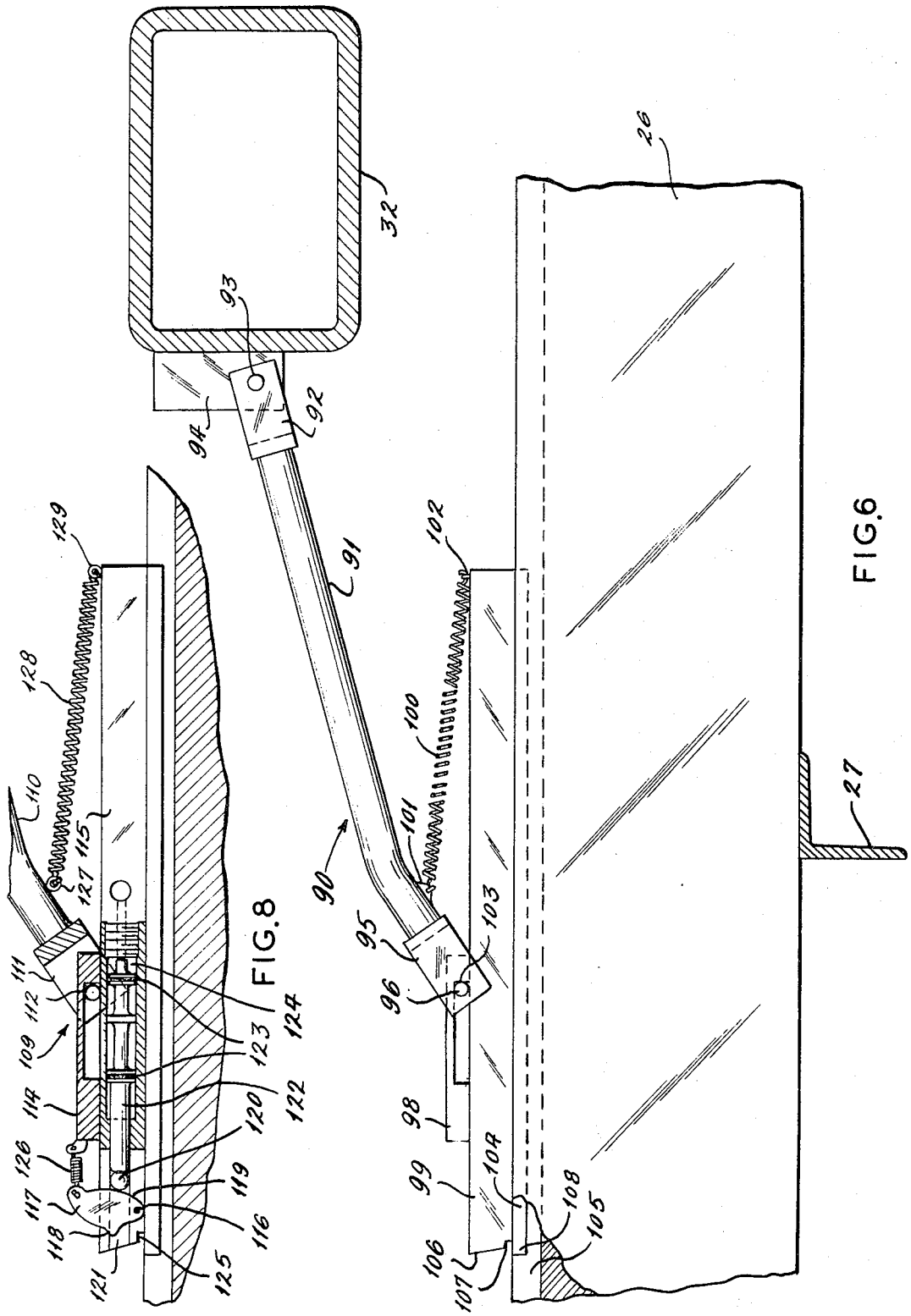

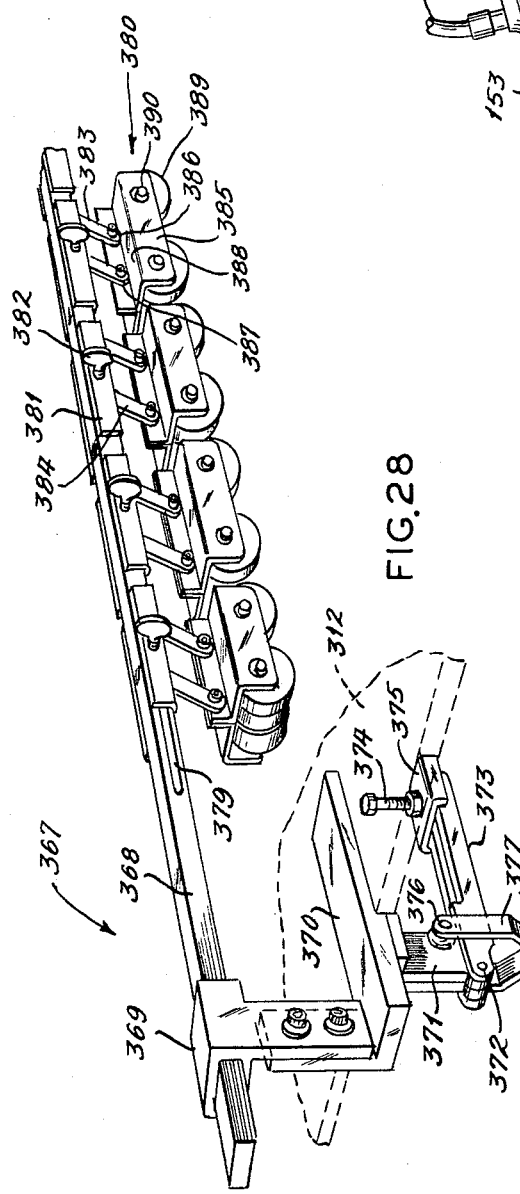
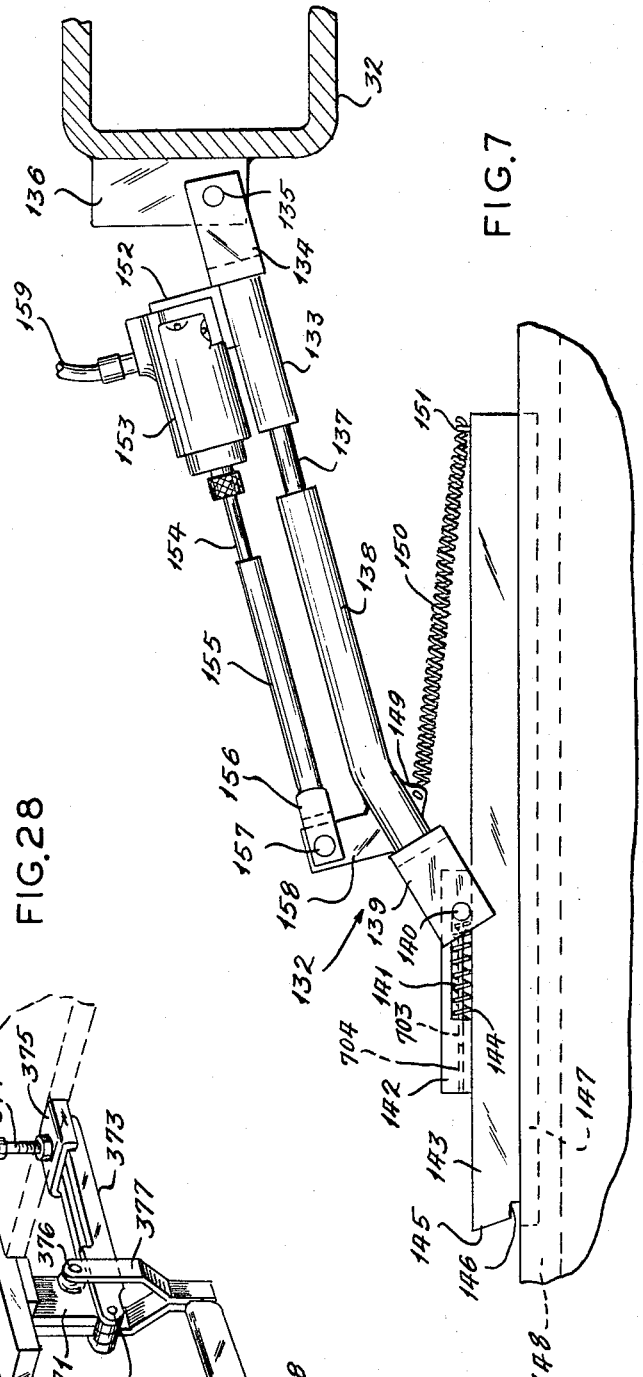

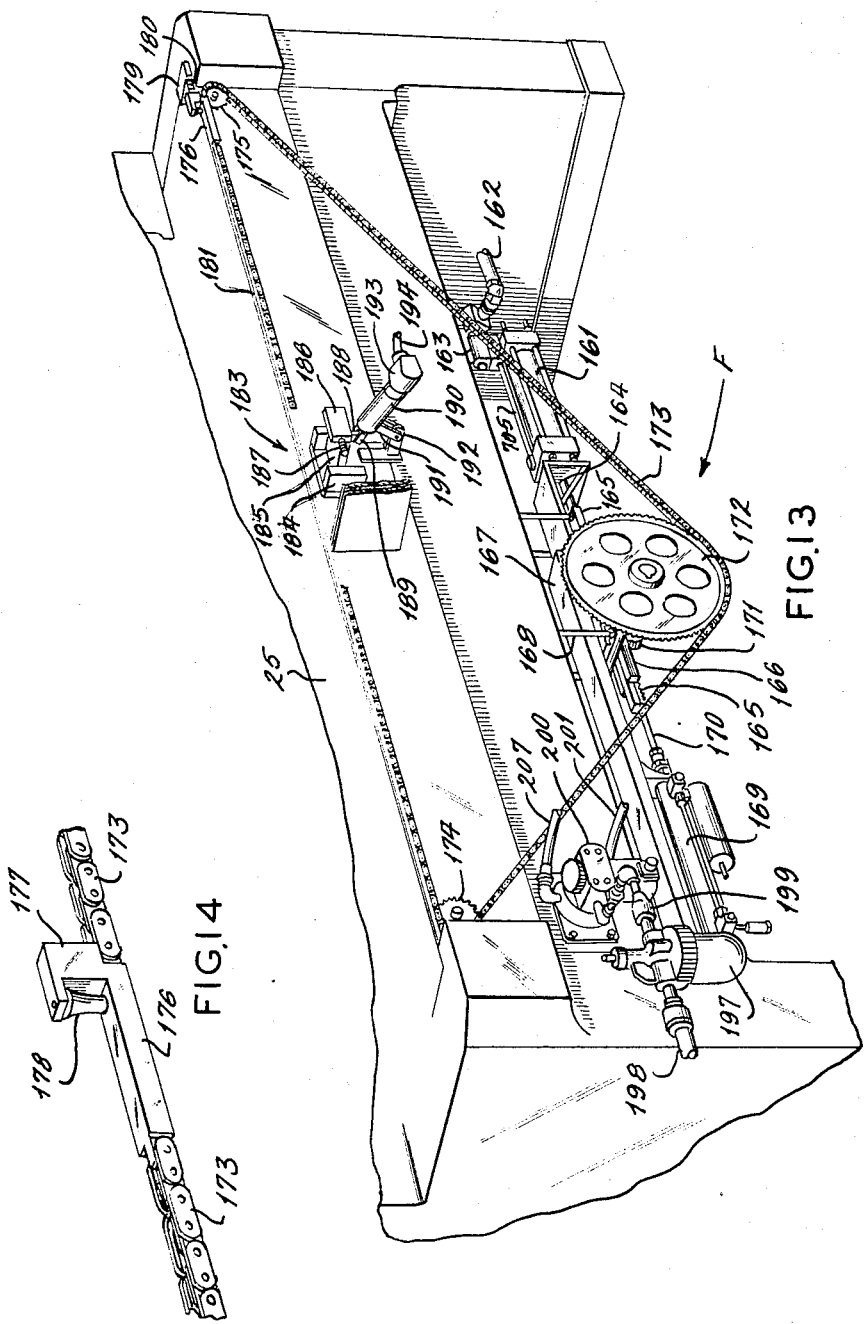

Nov. 19, 1968  J. M. WIESE  3,411,389

SHEARING APPARATUS AND METHOD

Filed April 27, 1966  18 Sheets-Sheet 13

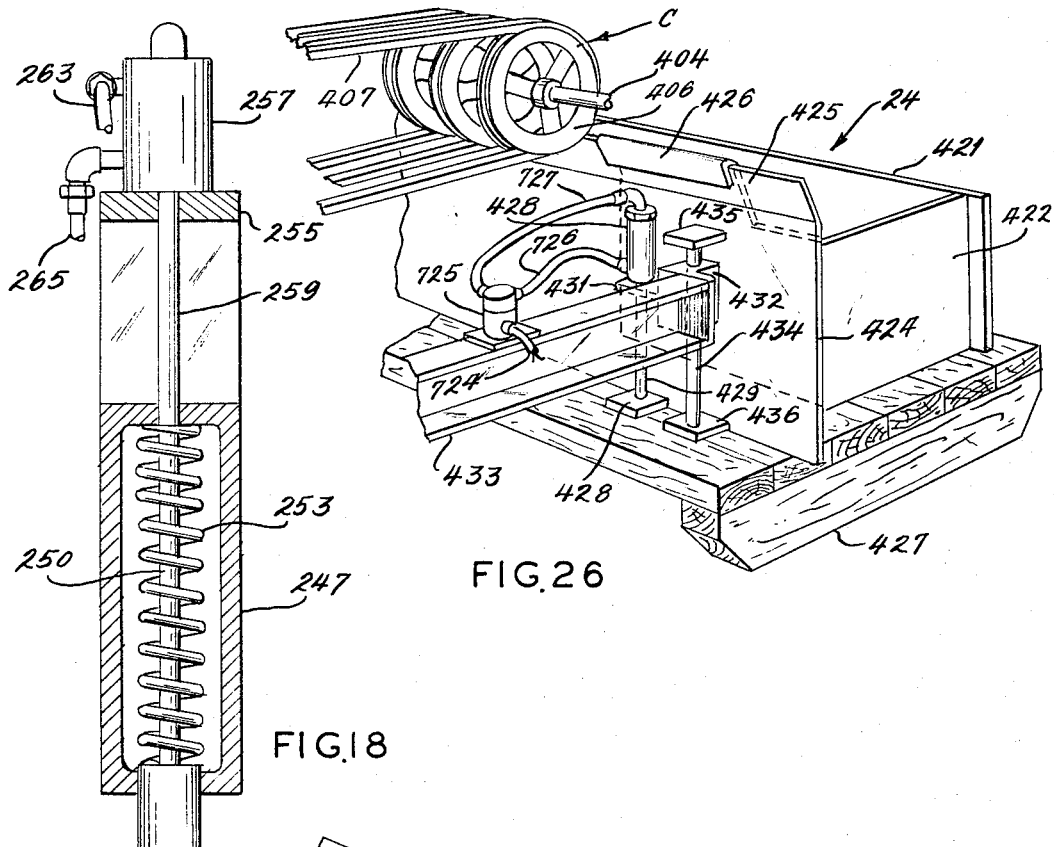
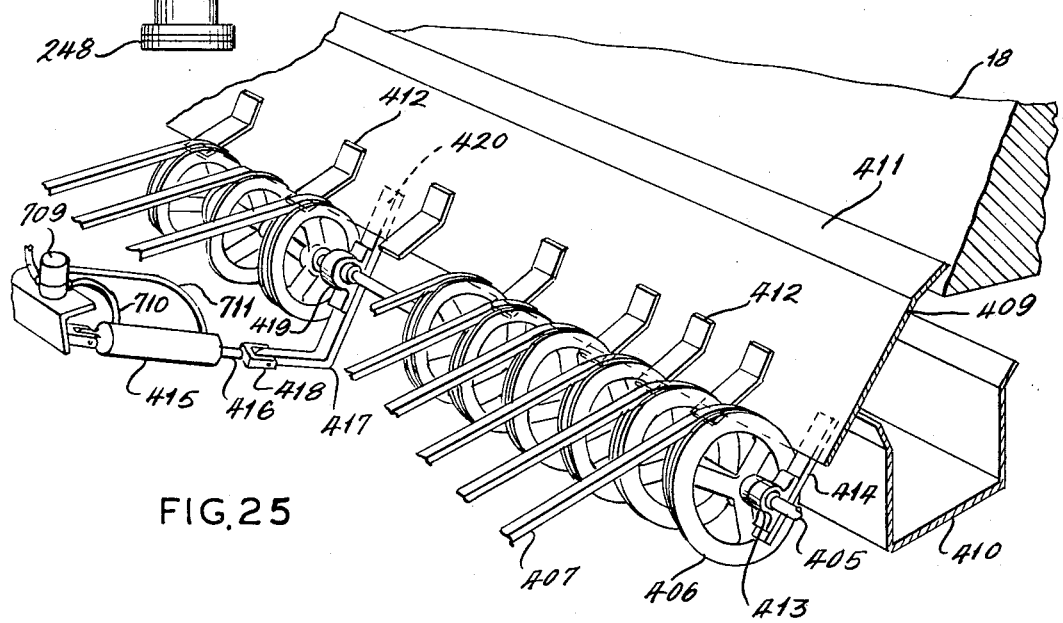

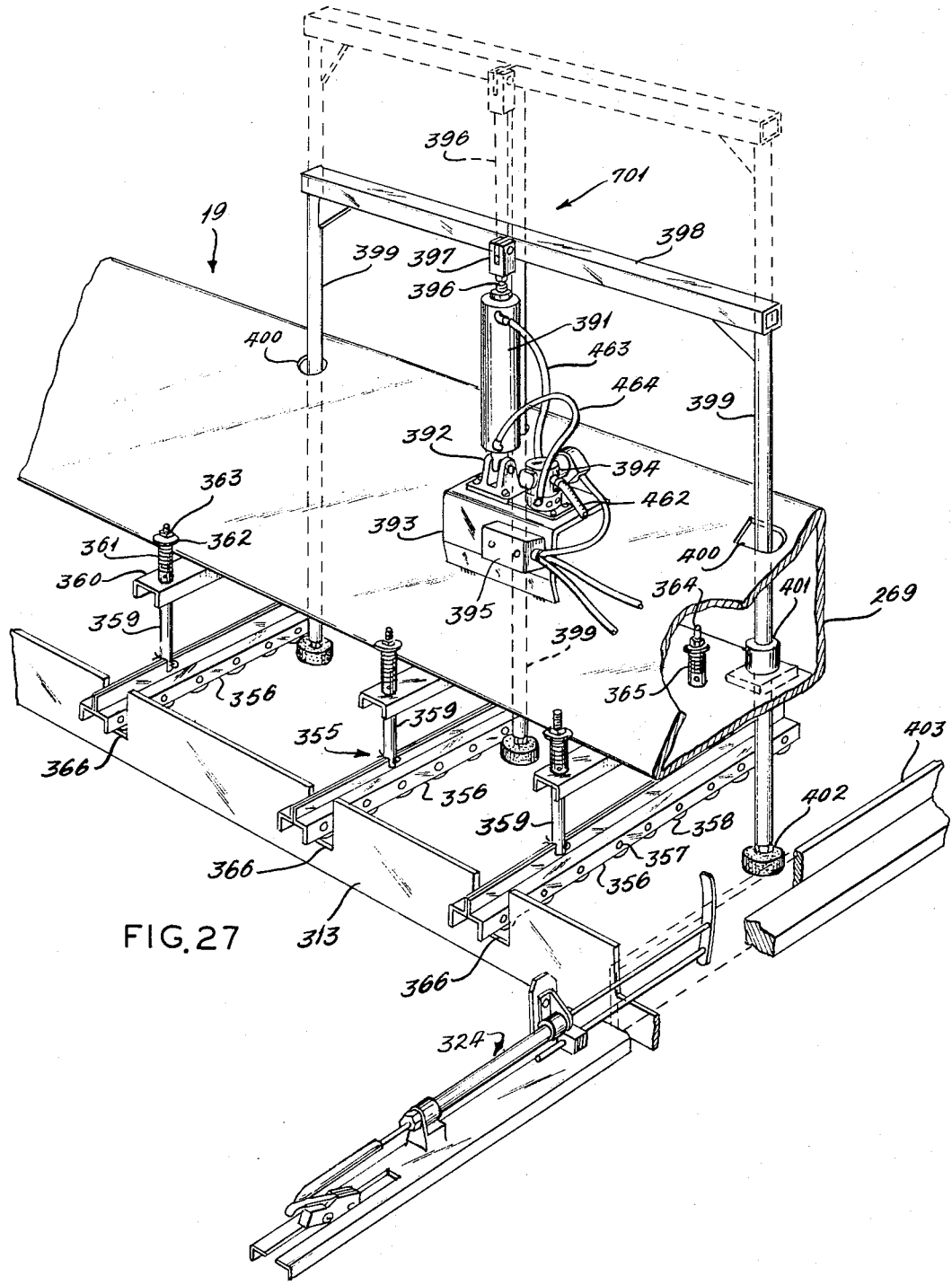

United States Patent Office 3,411,389
Patented Nov. 19, 1968

3,411,389
SHEARING APPARATUS AND METHOD
John M. Wiese, Kirkwood, Mo., assignor, by mesne assignments, to The Singer Company, New York, N.Y., a corporation of New Jersey
Filed Apr. 27, 1966, Ser. No. 545,641
18 Claims. (Cl. 83—94)

ABSTRACT OF THE DISCLOSURE

An apparatus for shearing sheet metal to precise dimensions and angularity. The apparatus functions automatically to: transfer rough-cut blanks of sheet metal from a stack thereof onto a delivery table; provide positioning mechanism to move the blanks between shear blades; actuate the shear blades after the blanks are properly aligned and measured to cut the blanks into precisely dimentioned and angled pieces; dispose of the remanent sheet metal and convey the properly cut sheet metal pieces to stacking apparatus for stacking.

This invention relates in general to the art of material cutting, and more particularly, pertains to an automatically operative shearing apparatus for and method of cutting metal or other material to predetermined and precise dimensions and angularity under automatic control.

It is a principal object of this invention to provide a fully automated shearing apparatus for use in trimming and cutting sheets of material to close tolerances and in rapid and continuous succession.

An increasing variety of machines and equipment incorporate in their construction a considerable volume of preformed thin sheet metal parts. Additionally, work in the various sheet metal or similar industries require the preparation of and use of a large volume of metallic sheets or plates that have been precut to precise dimensions and angularly true. Since the assembly line type of operation as presently utilized in most industrial concerns demands that a large volume of accurately cut sheet material be readily available for rapid incorporation into finished products, it is desirable to minimize the manual work heretofore required in the handling of, and controlling the precision and accuracy of cutting the sheet material stock, as well as the cut sheets and scrap. For example, in the current manufacture and assembly of air conditioners, heating units, furnaces and other like devices, a multitude of sheet metal parts are included within their construction. Such parts are individually and separately prepared from thin sheet metal or similar material which must be designed and cut to precise dimensions and angularity before they can be formed into the required configuration. These parts, prior to their conformation into the desired pattern must first have been cut as flat sheet material to exact dimensions and at close tolerances in order to comply with specifications. Heretofore, some shear machines have been available that function to cut metallic or other like sheet or roll material to approximate dimensions, but such machines have not been completely satisfactory in industry since the accuracy of their operation has been subject, at least in part, to control by human eyes and hands. Utilization of such machines is not compatible with present day assembly line processes since they do necessitate the cost of continuously available labor which naturally results in the expenditure of costly time and inefficiency in production. Other cutting devices which are semiautomatic in operation also do not provide the most efficient method for producing sheared metallic sheets in close tolerances. These types of machines generally require the part time use of labor or laborers, such as for individually delivering and selectively positioning the material for proper cutting, or they require manual effort for stacking the sheet material prior and subsequent to the shearing operation. For the foregoing reasons, a fully automatic shearing apparatus which cuts sheet material accurately to precise dimensions and angles is an expedient and desirable addition to the metal working art.

It is another object of this invention to provide a shearing apparatus which is automatized in performance and may be used for trimming and cutting sheet material to specified lengths without dependence upon human judgement in the operation.

It is still another object of this invention to provide a shearing apparatus which is useful for continuously and repeatedly trimming and shearing successive sheets of material, after the sheets have been perfectly aligned in preparation for their automatic delivery to the shear.

It is still an additional object of this invention to provide a shearing apparatus incorporating a delivery assembly which cooperates with means for advancing and retaining a sheet of material in true alignment so the sheet may be cut to exacting dimensions with precise angularity.

It is a further object of this invention to provide a shearing apparatus that incorporates means for automatically conveying and depositing separate sheets of material upon the apparatus, and aligns each sheet before shearing it.

It is still a further object of this invention to provide a shearing apparatus that functions to selectively convey precision cut sheets of material away from the shear and to uniformly stack them after segregating any trim or scrap that has been cut from the sheet stock in the production of the precisely cut sheets.

It is yet another object of this invention to provide a shearing apparatus which functions by means of cooperating pneumatic and electrical power to automatically cut sheet material to desired dimensions.

The foregoing and other objects of the invention are achieved by combining, and coordinating with a conventional shear, auxiliary equipment which: (1) transfers individual rough-cut blanks from a stock pile, and deposits them upon a delivery table in front of the shear in an orientation, with respect to the shear blade, approximating the orientation in which it is desired to feed the blanks to the shear; (2) accurately trues one edge of the a blank at the desired angle with respect to the shear blade; (3) maintains such trued relation while advancing the blank toward and past the shear blade, first rapidly, and then with diminishing velocity as the blank approaches the position, relative to the shear blade, at which it is to be cut; (4) arrests the movement of the blank without marring the previously cut edges thereof; (5) assures that the shear does not make a cut until the blank is angularly trued and dimensionally positioned so that the desired line of cut is aligned with the cutting edges of the shear; (6) prevents creepage of the blank during movement of the shear into and through the cutting operation; (7) advances the blank, after one cut has been made, quickly to the position at which the next cut is to be made; (8) segregates the scrap from the properly cut pieces; (9) stacks the properly cut pieces; (10) is easily adjusted to vary the length of cuts made from a blank; (11) is automatically controlled to execute the desired sequence of operations; and (12) interrupts the prescribed sequence of operation when a condition precedent has not been satisfied.

More specifically, the invention contemplates that the rough-cut blank be advanced, into angularly true relation with the shear blade and into position to be cut at the desired line, by pushing devices which abut the trailing edge of the rough-cut blank. In so doing, the velocity of the pushing devices is so controlled that when the leading edge of the blank meets an obstruction, such as a back gauge, the thrust is insufficient to buckle the blank, whereas prior thereto, the pushers have moved the blank at higher velocity to minimize the time consumed between successive operations of the movable shear blade. The latter is accomplished by providing substantially instantaneously operating brakes for arresting the advancing motion of the pushing devices in combination with means for retarding the travel of the blank so that it does not out-run the pushers when their speed is suddenly reduced, and, if desired, in further combination with a resilient mounting of the pushers which yields under forces less than sufficient to buckle the blanks. However, when all but one of the desired cuts has been made on a given blank (i.e., when the final cut is about to be made), it is preferred that at least one of the pushing devices exert a gripping action on the trailing margin of the blank which is to become scrap; and that such gripping take place at a location remote from that side of the blank which is initially aligned and angularly trued with respect to the shear blade in preparation for the cutting process. Such location of the gripping pusher is desirable because when so little (preferably no more than an inch) of the blank remains on the pusher side of the movable shear blade, and so much of the blank extends beyond the shear blade, there is a tendency for the blank to skew as the cutting action progresses from one side edge of the blank toward the other side edge. Hence, the more remote locus of gripping from the point of initiation of the shearing action, the less force required to prevent such skewing. But, it is yet necessary that at least one of said pushing devices that exert a gripping action upon the blank be located seemingly proximate to that side of the blank as initially aligned so that the remaining piece of trimmed scrap may be retained until completion of the final cut and then uniformly released off of the shear downwardly into a scrap depository. By gripping the remanent piece of trimmed scrap in the foregoing manner it is prevented from undesirably pivoting away from the shear and thereby bypass the aperture leading to said depository. This gripping action has a tendency to stabilize the blank while it traverses through the shear during the cutting operation.

The invention further contemplates that once a given blank has been cut or trimmed (either in the shear or previously) so that the two angularly related edges which bound a leading corner are true, the subsequent shearing operations on that blank are controlled by a plurality of spaced sensors, such as micro switches, all of which must be actuated by one or both of two trued edges of the blank (or what is left of it), and at least two substantially spaced ones of which are actuated by the then leading edge of the blank. Moreover, it is preferred that during the advance of the blank, between strokes of the shear, the blank be deliberately moved slightly (e.g., about one degree) out of angularly true relation with the shear blade (so that one corner of the leading edge trails the opposite corner of that leading edge), and then, after the momentarily leading corner of the blank has come to rest against a back gauge, the final increment of advancing movement retrues the leading edge into parallel relationship with the shear blade by pivoting the blank about the momentarily leading corner until the momentarily trailing corner has come into proper alignment. Such final increment of movement actuates the last one of the series of spaced sensors necessary to initiate a stroke of the shear. This mode of operation minimizes the likelihood that the blank may bounce away a modicum from the back gauge after actuating the sensors, and hence be caught by the descending shear and miscut. This deliberate rearranging of the blank from alignment, then out of angularly true relation with the shear blade, and eventually back into alignment for the cut reduces the number of sensors required to be mounted along the back gauge and that must be actuated by the leading edge of the blank for energizing the shear to cut. For example, one or more closely orientated sensors may be mounted upon the back gauge proximate to the side of the blank that is initially aligned, and has its leading corner trailing the opposite corner of the leading edge of the blank, so that as the blank contacts the back gauge, the trailing corner will eventually be pivoted flush against the back gauge and actuate the proximate sensors. Thus it can be seen that blanks of any width may be utilized in conjunction with this shearing apparatus, and is not necessary that sensors be affixed along the entire width of the back gauge.

A further feature of the invention arises out of a problem attributable to the fact that sheet metal stock as received by fabricators is customarily coated with a film of rolling mill lubricant, the presence of which has a tendency to cause the sheet stock to stick to the flat bed conventionally provided in front of the blades of a shear, and require that the sheet stock be manually lifted to "break the vacuum" before it can be slid across the bed into shearing position. The present invention contemplates that the vacuum be prevented from forming by the provision, on the shear bed, of a plurality of spaced minuscule ribs. Such ribs are secured to the bed so as to extend far enough above its surface to admit a thin layer of air between a sheet (resting on the ribs) and the subjacent surface of the shear bed. Preferably, such ribs are arranged out of either parallel or perpendicular relationship with the shear blade, and terminate substantially short of the blade.

The versatility of the apparatus of the present invention for carrying out various methods of cutting sheet stock is illustrated by the fact that, by appropriate operation of the control devices, the techniques known in the metal fabricating industry as "trim sequence" and "split sequence," regardless of whether the distance between successive cuts on the same blank is long or short, may be carried out at will.

A typical "trim sequence" involves making a succession of parallel cuts, usually six or more inches apart, on a given blank, and includes the following sequence of operations:

(A) A trim cut of about $3/32$ of an inch to square, or otherwise true, what will become the leading edge of the blank with a side edge thereof, and depositing the trimmed strip in a scrap depository;

(B) Successive parallel cuts, all to the same dimension, as desired, until the residual blank is of a dimension less than sufficient to accommodate another such cut, and delivering the true-cut pieces to an appropriate depository distinct from the scrap depository;

(C) Ejecting the residual scrap into a scrap depository.

In the "trim sequence," the shear can operate either on a "once-action basis" or a "repeat-action basis," depending upon whether the distance between successive cuts is long or short.

On the "repeat-action basis," after each successive cut except the last, the leading edge of the blank (produced by the last preceding cut), when moved to proper position for the next succeeding cut, actuates sensors which in turn actuate agencies to automatically initiate another cycle of the shear from its upper position to its cutting position, and back to its upper position.

On the "once-action basis," the cutting cycle of the shear is further controlled by agencies which assure both: that the sensors have already resumed their normal position; and that the shear ram has already completed a previous cycle. Thus no succeeding cut may be made until after the cut piece resulting from the preceding cut has cleared the sensors, after the shear ram has reached the top of its stroke, and after the leading edge of the residual blank has actuated the sensors.

A "split sequence" is usually made upon blanks to produce pieces between successive parallel cuts more than six inches apart, but in a "split sequence," the blank has already been cut to a perfect multiple of the size of each desired individual piece, so that there is no trim cut and no scrap. The shear usually operates on a "once-action basis," except that when the final cut is made on a given blank, and the leading edge of the residual piece subsequently reaches the agencies which, in previous cycles, had actuated the operation of the shear, those agencies are automatically disabled.

Other features and advantages of the invention will become apparent to those skilled in the art when the following description is read in connection with the accompanying drawings, in which the shearing apparatus is illustrated in a form intended to make successive cuts perpendicular to one edge of the blank being cut, which is the most typical industrial application for the apparatus.

In the accompanying drawings:

FIGURE 4 is a perspective view of the rough-cut blank delivery assembly shown on smaller scale in FIGURES 1 and 2;

FIGURE 5 is a detail view of a portion (nearest the reader in FIGURES 1, 2, and 4) of the rough-cut blank delivery assembly of the shearing apparatus;

FIGURE 6 is a side view of a pusher member of the rough-cut blank delivery assembly;

FIGURE 7 is a side view of an extendible pusher member included in the rough-cut blank delivery assembly;

FIGURE 8 is a fragmentary sectional side elevation of another pusher member embodied in the rough-cut blank delivery assembly and showing an air operated scrap holder as seen on line 8—8 of FIGURE 5;

FIGURE 12 is a perspective view of the brake mechanism of the rough-cut blank delivery assembly;

FIGURE 13 is a perspective view of a lateral rough-cut blank feed assembly mounted to the frontal portion of the shear;

FIGURE 14 is an isometric view of certain parts of the lateral feed assembly shown on smaller scale in FIGURE 13;

FIGURE 18 is a partial section view of an air operated rough-cut blank prehold-down taken on line 18—18 of FIGURE 15;

FIGURE 19 is a partial sectional view of a rough-cut blank hold-down with a broken line outline of the plunger retracted;

FIGURE 24 is a partial sectional view of a target sensor taken on line 24—24 of FIGURE 3;

FIGURE 25 is a perspective view partially in section taken on line 25—25 of FIGURE 3 and showing a scrap gate assembly;

FIGURE 26 is a perspective partial view of the conveyor, back gate, and stacker depository shown in part in FIGURES 1 and 2;

FIGURE 27 is a perspective view of part of the shearing apparatus as shown in FIGURE 3 with certain parts removed and others cut away to reveal the relationship of a speed reducing sensor, magnetic cut-blank holders, and a blank striker, with a broken line outline of the blank striker shown in raised position;

FIGURE 28 is a perspective partial view of an auxiliary magnetic holder for the cut blanks of material;

Figure 1:
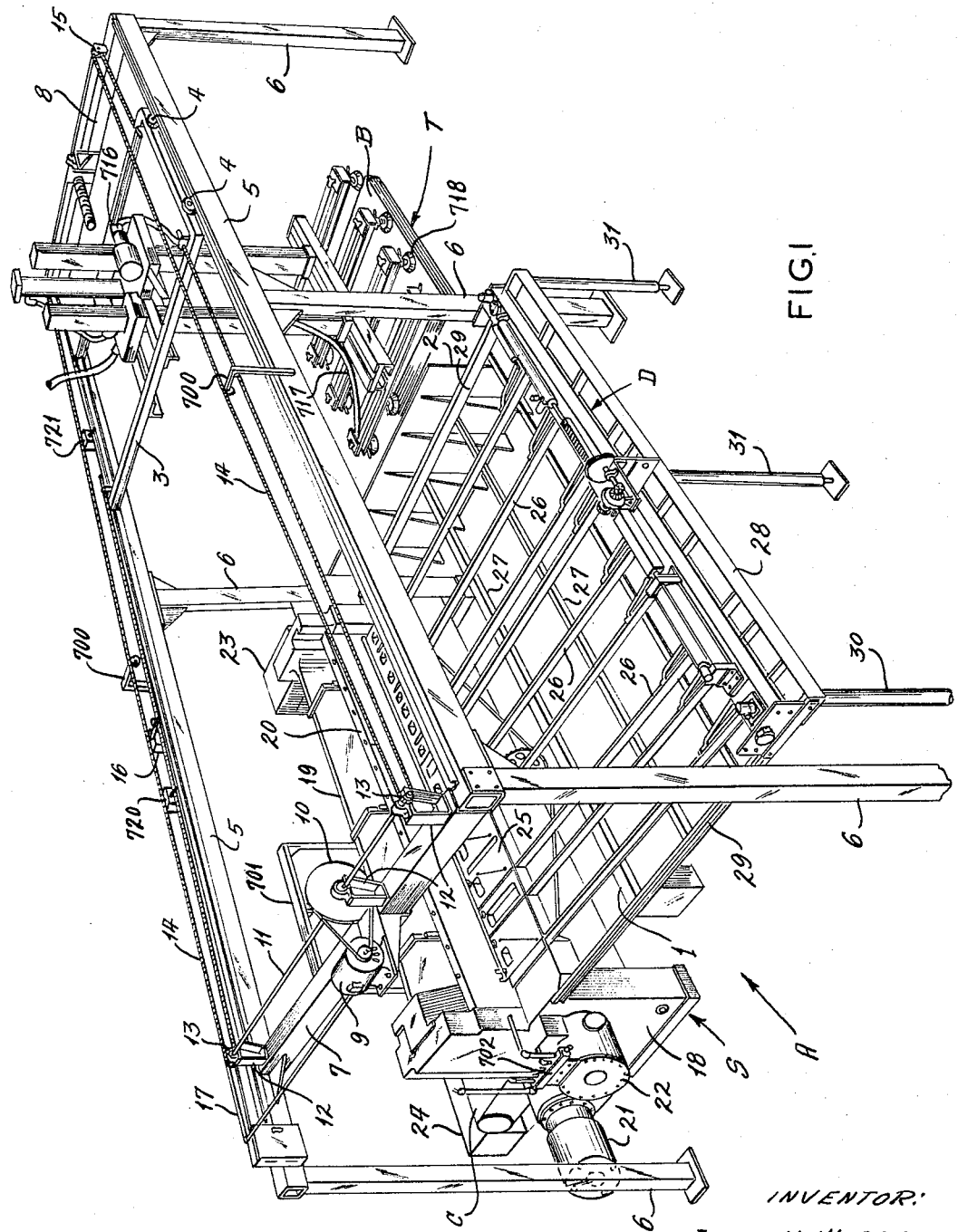
FIGURE 1 is an abbreviated perspective view of the shearing apparatus as revealed in conjunction with the vacuum operated device for transferring individual rough-cut blanks from a stock pile to a delivery table in front of a shear.

The present invention relates to an apparatus and method for automatically shearing rought-cut blanks of material to accurate dimensions and at extremely close tolerances, after each blank has been properly aligned in preparation for the shearing operation. Referring to FIGURE 1, there is disclosed the shearing apparatus A in combination with a vacuum operated blank transferring device T. The blank transferring device T in operation automatically transfers rough-cut blanks B of metallic or other similar material to the delivery table 1 of the shearing apparatus, from the area beyond a barrier, where the aforesaid rough-cut blanks have been previously randomly stacked into a stock pile pending their transfer to the table. The construction of the vacuum operated blank transferring device forms no part of this invention, but its use in combination with the shearing apparatus for providing a totally automated method for accurately shearing blank material is within the purview of this invention. The vacuum operated transferring device T may be acquired from a selective commercial source, and any other suitable device may be employed for the purpose without departing from the principle of this invention. The blank transferring device T is mounted upon a movable frame 3, which has rotatably affixed, proximate each end of its sides, a pair of rollers 4 which are disposed for ease of movement upon rails 5. The rails 5 are fully supported by means of rigid columns 6. Spanning each end of the rails 5 is a pair of cross beams 7 and 8, with the beam 7 supporting an electrical motor 9 that provides rotary motion to a sprocket wheel 10 and connecting shaft 11. The shaft 11 is supported as by journalling to the spaced apart bearing mounts 12, and to each end of the shaft is connected a sprocket 13. Upon turning of sprockets 13 by actuation of the motor 9, endless link chains 14 engaging said sprockets 13 are moved to induce a lateral movement of the frame 3 and the associated transferring device T. The link chains 14 are supported at their other ends by means of the sprockets 15 mounted upon the cross beam 8. The link chains receive further support by means of the bracings 700 that are mounted approximately at the central portion of the rails 5. An electrical switch 16 is mounted to one of the rails 5 and is disposed for actuation by the frame 3 as it passes thereby. The actuation of the electrical switch 16 provides for the energization and operation of selective components encompassed within the shearing apparatus A. Mounted upon a rail 5 is a pair of switches 720 and 721 which are also actuated by means of movement of the frame 3 thereby, and defines the limits of movement of the blank transferring device T as it laterally shifts from its position over the stock pile to the shear table and back. Also extending along one of the rails 5 is an electrical line 17 which conveys electric power to provide for functioning of the motor.

The shearing apparatus A comprises a conventional shear S which has been modified to provide for its incorporation and cooperation in compliance with the principles of this invention. The shear S is comprised of a framework 18 having a ram 19 slidably mounted thereto for reciprocal vertical movement. A cut blank material striker 701 works in cooperation with said shear ram and provides for a release of the precision cut blanks of material for their further transfer to the stacker depository 24. A blank sheet material hold down 20 is likewise mounted for vertical sliding movement relative to the shear framework 18, and functions during the cutting operation to bind each blank tightly to prevent shifting while being cut by action of the shear. Attached to one side of the framework 18 is a conventional electrical motor 21, in this case being of three phase, 220 volts, which when energized cooperates with gears disposed within the gear compartment 22 providing means for coordinating the vertical movement of the aforementioned shear ram 19 and hold down 20. Connected to the shear framework above the gear compartment is a main air manifold 702 which functions to direct the main supply of pressurized air to the various selective components of the shearing apparatus to render them operative. Located at the other side of the shear framework 18 is an electrical control panel 23 wherein are disposed a plurality of electrical switches and relays that cooperate to provide for the selective energization and sequential operation of the various parts of the shearing apparatus A. Extending rearwardly from the shear S and properly aligned to receive the precision cut blank material B is a conveyor C which is used for transfer of said blank material to the stacker depository 24. Integral with the frontal portion of the shear framework 18 and projecting forwardly therefrom is a shear bed 25 which is aligned with the cutting mechanism of the shear so as to provide for the uniform transfer of the blank material thereto.

The delivery table 1 is constructed of a plurality of spaced apart parallel rails 26 which are held rigid by means of a series of equally spaced lateral bracings 27 and the angle bracing 28. Along each side of the table is secured a laterally facing channel rail 29. The delivery table 1 provides a level planar surface upon which the rough-cut blanks of material to be trimmed and dimensionally cut is deposited by means of the transferring device T just prior to the shearing operation. The entire delivery table is structurally stable in construction, and is spaced upwards from the floor by means of the leg 30 and adjustable legs 31 which are secured at their upper ends to the forward end of said table by attaching to the aforementioned angle bracing 28, with the other end of table 1 interconnecting to the shear bed 25 of the shear S.

Figure 2:
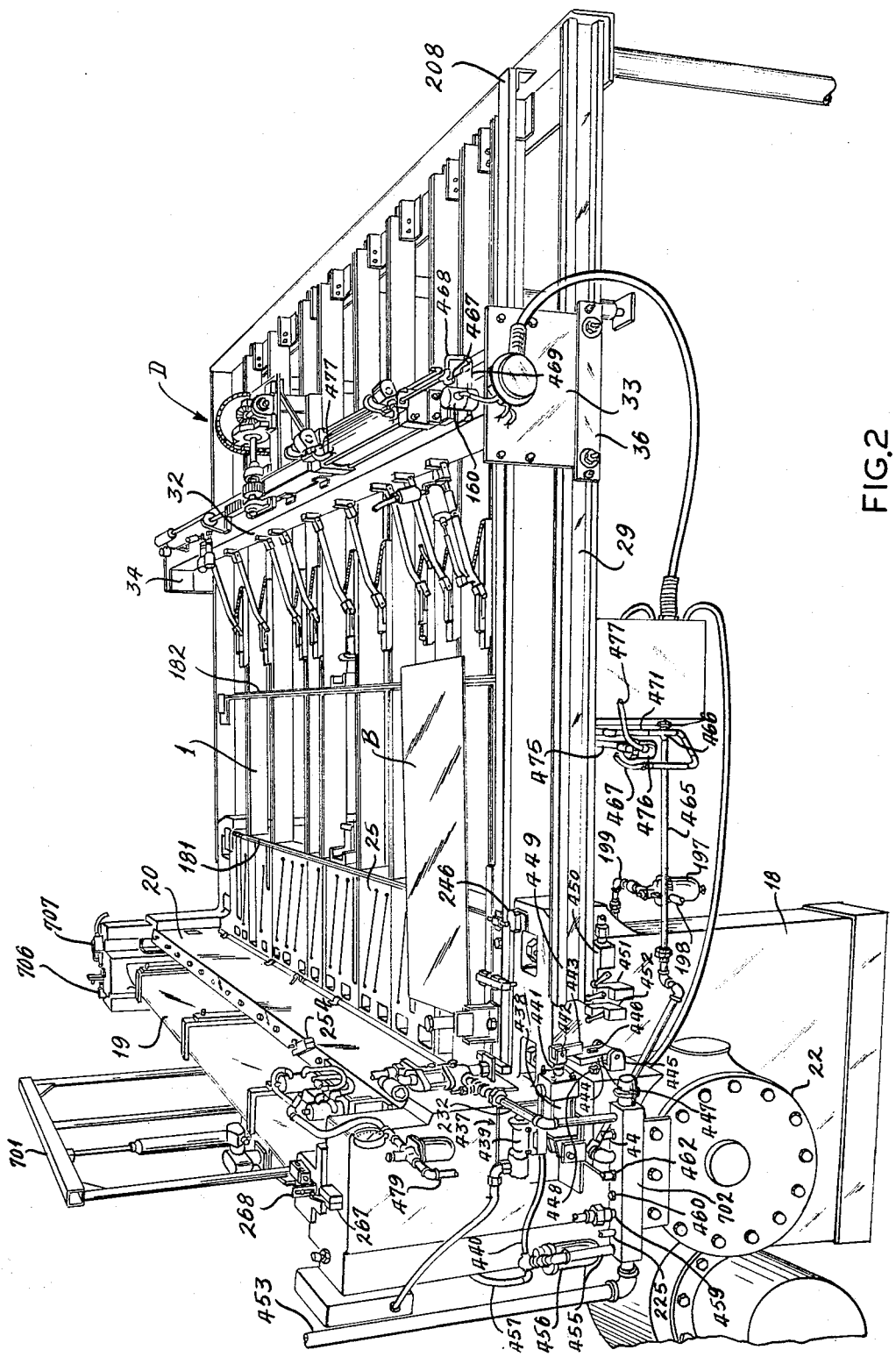
FIGURE 2 is a perspective partial side view of a rough-cut blank delivery table and associated mechanism arranged in front of a shear.
Figure 9:
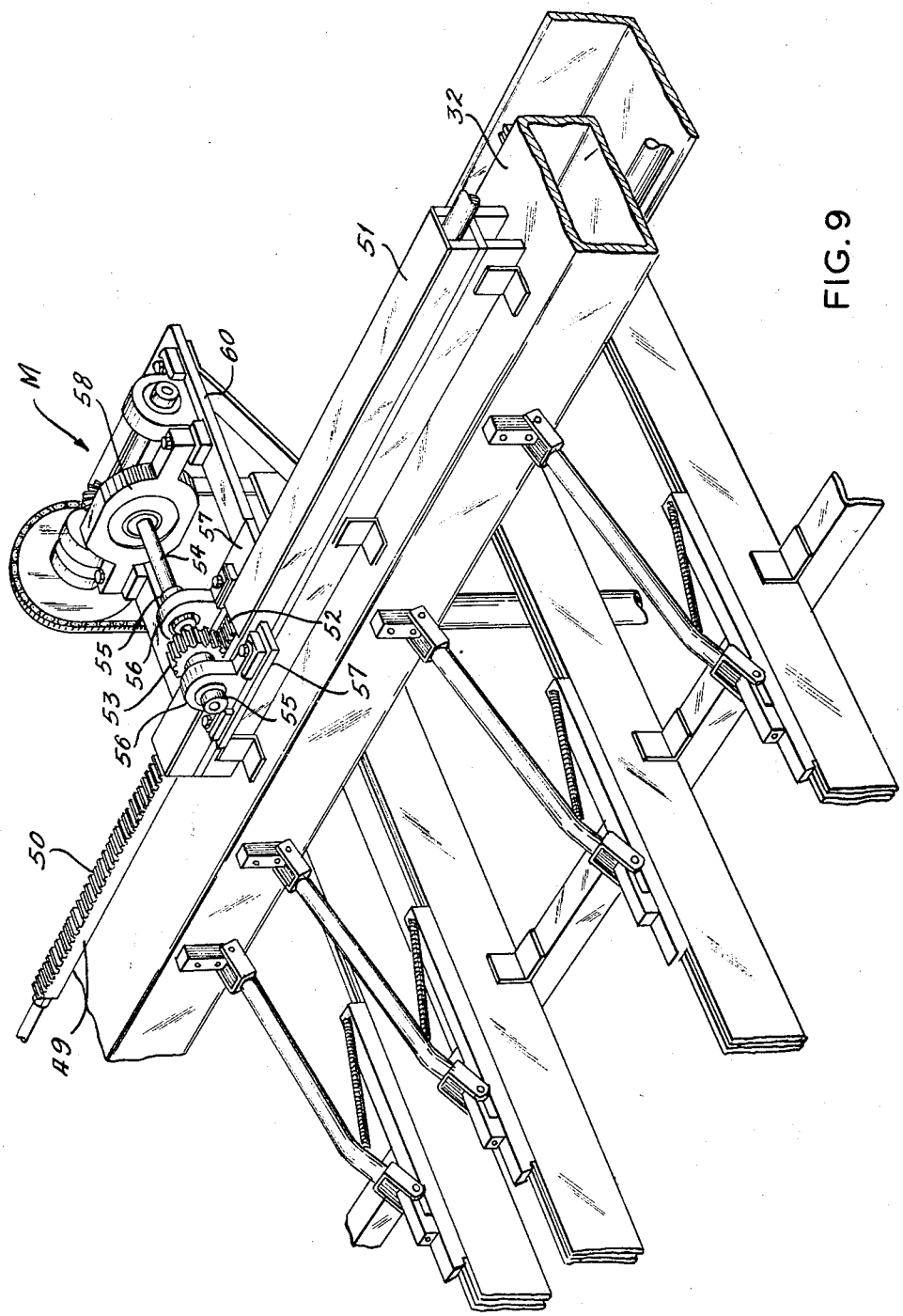
FIGURE 9 is a perspective partial view of the central portion of the rough-cut blank delivery assembly of the shearing apparatus.
Figure 10:
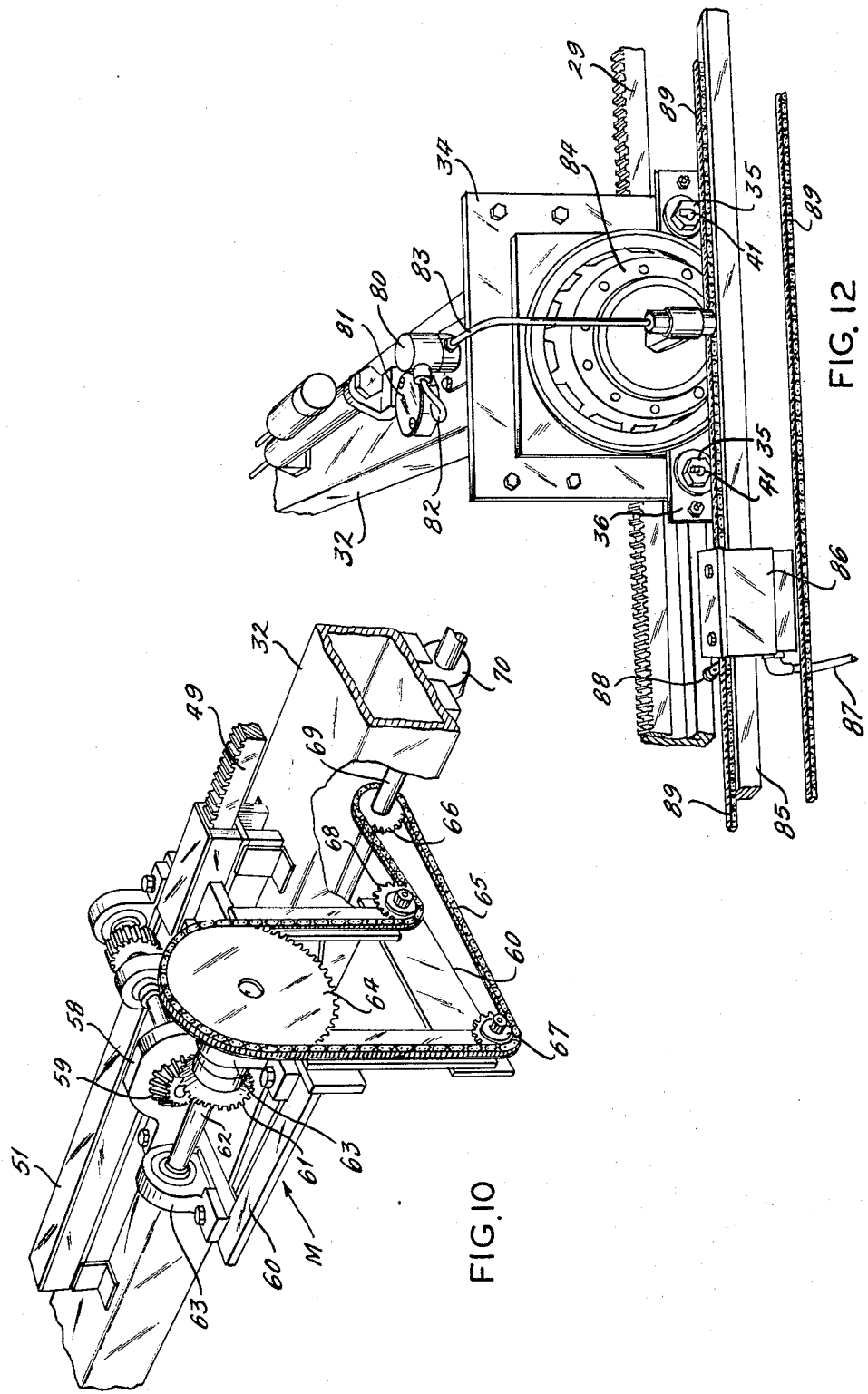
FIGURE 10 is a perspective fragmentary view of the drive mechanism of the rough-cut blank delivery assembly.

Positioned upon the upward surface of the delivery table 1 and disposed for movement toward and away from the shear S is the delivery assembly D which functions to uniformly slide and advance the blank material B toward the shear for the cutting operation subsequent to its deposit upon said table. Referring to FIGURE 2, the relationship of the delivery assembly with the table 1 is more clearly disclosed, and comprises a beam like member 32 that extends the full width of the delivery table, being spaced upwardly from said table a predetermined distance, and having cover plates 33 and 34 rigidly fixed to its respective ends. Attached to the bottom edge of each cover plate by means of fasteners 35 (see FIGURES 5 and 12) is a support 36 which has attached to each of its overlapping ends a pair of rollers 37 that engage the surface 38 of the channel rail 29. Also, mounted upon the fasteners 35 are a pair of rollers 39 that move upon the surface 40 of each channel rail 29. The stabilization achieved by means of the bearing of the rollers 37 and 39 against the various angularly related surfaces provided within the channel rails 29 eliminates any play or looseness in the delivery assembly with respect to its mounting upon the delivery table 1. A pair of grease fittings 41 are attached to the fasteners 35 and provide means for lubricating the rollers 39. Mounted upon the beam 32, as disclosed in FIGURE 4, is the delivery assembly main air cylinder 42 which is secured to said beam intermediate a pair of end supports 43 and 44 and tightened in place by means of a series of tie rods 45. The air cylinder 42 is of a conventional type that provides for a two way operation wherein air under pressure may force an internal piston (not shown) to be forced toward either end of said cylinder. Affixed atop the end support 43 is a solenoid operated air valve 46 which releases pressurized air onto the cylinder when it is desired to move the entire delivery assembly toward the shear in a manner to be hereinafter discussed. Also, affixed on top of the end support 44 is a solenoid operated valve 47 which provides for the passage of pressurized air into the cylinder 42 for retraction of the delivery assembly from the shear after the cutting operation has been completed. The piston contained within the cylinder 42 connects to a shaft 48, and said shaft is integral with a rack 49 containing a series of upwardly disposed gear teeth 50. The rack 49 is protected and guided in its movement by means of a cover 51 which is connected upon the upper surface of said beam 32. The gear teeth of the rack 49 engage, through an opening 52 provided in the cover 51, with a gear 53 of the drive mechanism M of the delivery assembly. (See FIGURE 9.) The gear 53 is secured to a shaft 54, and rotates in unison with said gear when the latter is turned by means of the lateral shifting of the rack 49. The shaft 54 is journalled within bushings 55 contained in the mounts 56, with said mounts being supported upon a series of plates 57 which are secured to the side of the cover 51. The shaft 54 is further journalled within a mount 58 and has secured to its end a bevel gear 59. (See FIGURE 10.) The mount 58 attaches to a framework 60 which is structurally connected to the cover 51 and to a side of the beam 32. The bevel gear 59 intermeshes with a second bevel gear 61, and said bevel gear 61 is secured to a shaft 62. This shaft is journalled within a pair of mounts 63 which are secured to the framework 60. Attached to an end of the shaft 62 is a sprocket wheel 64 which is engaged by means of a link chain 65 for cooperating with a sprocket wheel 66. The link chain 65 angularly turns around a pair of idler sprockets 67 and 68 which are mounted for free rotation upon the framework 60. The sprocket wheel 66 is fastened upon a drive shaft 69, and said drive shaft is journalled to the underside of the beam 32 by means of one or more mounts, as at 70. Thus, it can be seen that the linear shifting of the rack 49 can be converted by means of the operation of the drive mechanism M into a rotary motion of the drive shaft 69. To each end of the drive shaft 69 there are connected spur gears 71 and 72 which engage, respectively, with the gear teeth provided upon the upward surfaces of the channel rails 29 of the delivery table 1. (See FIGURES 5 and 11.)

Figure 11:
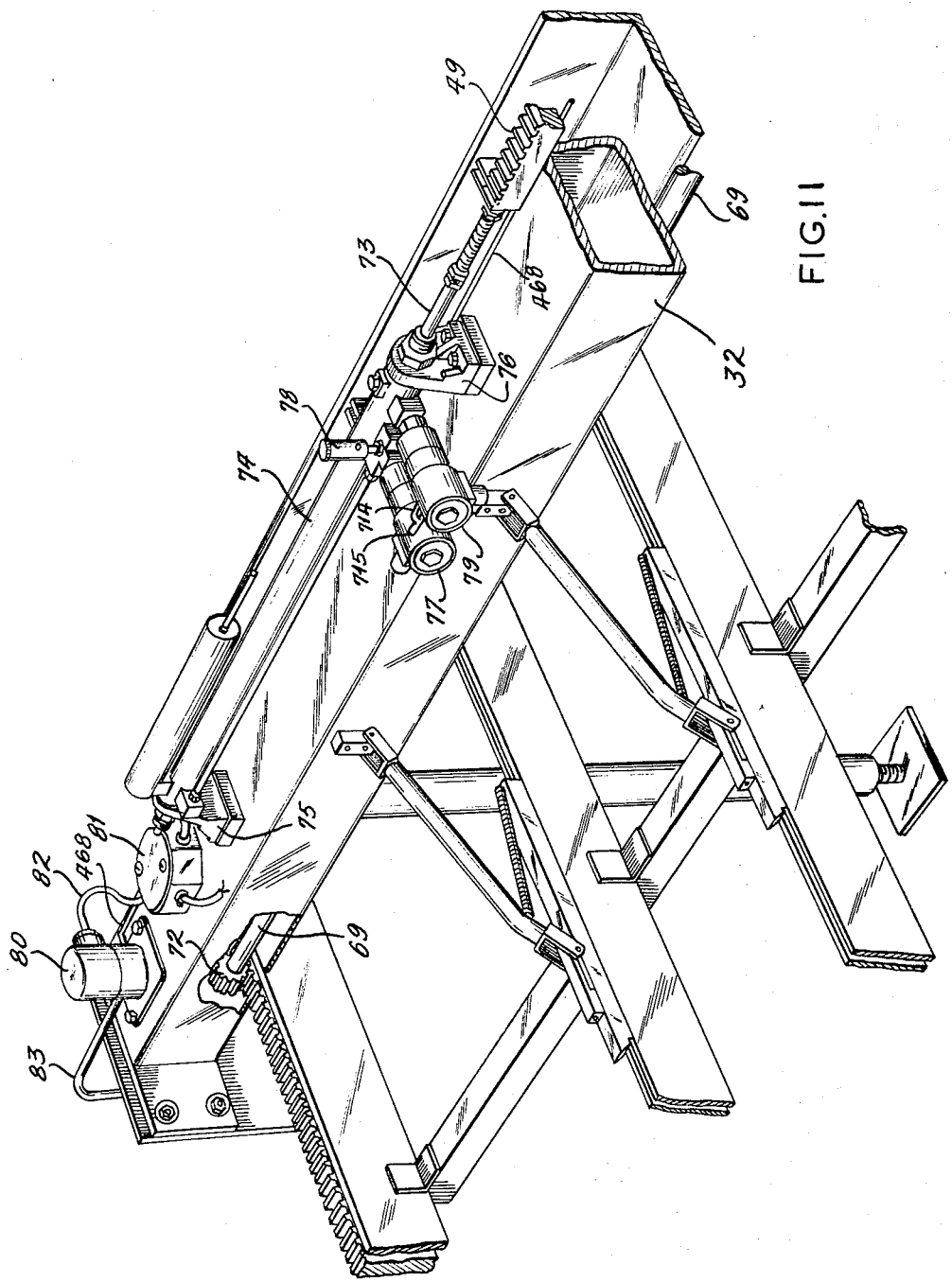
FIGURE 11 is a perspective fragmentary view of a portion (remote from the reader in FIGURES 1, 2 and 4) of the rough-cut blank delivery assembly of the shearing apparatus.

The rack 49 connects integrally to a shaft 73 which extends inwardly of an oil cylinder 74 containing a piston-like arrangement that functions when actuated to meter the flow of oil therein and thereby reduce the speed of movement of the delivery assembly as it feeds the rough-cut blanks of material B to the shear (see FIGURES 4 and 11). The cylinder 74 is secured mounted to the upper surface of the beam 32 by means of the supports 75 and 76. Attached radially to cylinder 74 is a solenoid operated valve 77 which when electrically energized admits pressurized air to actuate its valve and effect a regulation of the flow of oil within the cylinder. An adjustable oil meter valve 78 is attached to the solenoid operated valve 77 and is disposed for manual adjustment for controlling the flow of oil in the cylinder 74. Also attached radially to the cylinder 74 is a solenoid operated valve 79 which when electrically actuated induces pressurized air to close off the valve and thereby curtail the flow of oil within the cylinder for stopping the lateral movement of the shaft 73 and rack 49, and consequently act as a brake against further movement of the delivery assembly.

Secured to the beam 32 proximate an end is a solenoid operated air valve 80 which is connected to the electrical junction box 81 by means of circuit line 82, and said valve supplies air through the air line 83 to a braking mechanism, in this illustration an air brake 84 (see FIGURE 12). This air brake is of a conventional manufacture and is readily available commercially, and functions when actuated to immediately stop the movement of the delivery assembly upon the delivery table 1. It is obvious that a magnetic brake may just as easily be provided in place of the air brake 84, and function similarly when energized to instantaneously stop the delivery assembly from moving toward or away from the shear. Provided near the support 36 of the cover plate 34 is a bar 85 which is maintained parallel to the channel rail 29 and extends the full length of the delivery table 1. Mounted to the bar 85 is an electrical limit switch 86, having electric power supplied thereto by means of the circuit line 87. The limit switch 86 is actuated by means of the support 36 engaging and depressing the aligned switch lever 88 upon return of the delivery assembly from further movement on its return from the shear, and also acts to provide for energization of various other components within the electrical circuitry of the shearing apparatus, as will be hereinafter discussed. Switch 86 is connected to an endless link chain 89 and through the movement of the chain, the switch may be slid upon the bar 85 for disposition at any fixed point along the side of the delivery table 1. In this manner, the limit switch 86 may be disposed at a predetermined point along the side of the delivery table 1, and thereby function to brake any further movement of the delivery assembly at any set distance from the shear upon its return from having advanced a rough-cut blank of material to said shear. For example, when the blank material is of small dimensions, it may not be necessary for the delivery assembly to fully return to the forward most end of the delivery table. The limit switch 85 may be used to lessen the length of travel of the delivery assembly to and from the shear, and thereby expedite the operation of the shearing apparatus.

Referring to FIGURES 4 and 6, there is revealed a series of pusher members 90 which are pivotally mounted to the side of the beam 32. Each of these pusher members is comprised of an arm 91 which is integrally connected at one end to a clevis 92. The clevis is pivotally mounted as by a pin 93 to a mounting member 94 which is secured to the side of the beam 32. The other end of each arm 91 attaches to a second clevis 95, and is pivotally mounted as by a pin 96 for slidable movement with respect to a slot 97 provided within the blank 98 which is secured to the top surface of a blank engaging member 99. A resilient spring 100, normally in tension, attaches, as at 101, to the arm 91, and is connected at its other end to the upper portion 102 of the blank engaging member. The natural resiliency of the spring 100 normally biases the member 99 in one direction so that the pin 96 is usually disposed at the end 103 of the slot 97. Projecting downwardly from the bottom surface of each of the blank engaging members 99 is an integral runner 104 which is of a length approximately equivalent to the length of said member 99, but has only a sufficient width which provides for its close tolerance fitting for sliding within the slideway 105 provided within each rail 26 of the delivery table 1. The end 106 of the blank engaging members 99 are inclined, downwardly and inwardly, and blend into an indentation 107 which is useful for loosely receiving and retaining the trailing edge of the blank sheet material as it is being fed to the shear S. It is to be noted that the end 108 of the runner 104 projects slightly ahead of the member 99 so as to further insure ease of insertion of the trailing edge of the blank material into the indented portion 107. The cooperation of the runners 104 within the slideways 105 of the rails 26 assist in maintaining the pusher members 99 stabilized with respect to the delivery table as when the delivery assembly D moves toward or away from the shear S, and also when the members 99, while moving at rapid speed, initially engage the blank material for advancing it toward the shear. Additionally, the impact created when the pusher members 90 engage a rough-cut blank is cushioned by means of the resiliency inherently provided in the spring 100.

The pusher member 109, as revealed in FIGURES 4 and 8, is similar in construction to the pusher members 90 previously discussed, in that it also is pivotally mounted to the beam 32. An arm 110 connects to a clevis 111 which is held by a pin 112 provided within the slot 113 of the block 114 secured to the top of the blank engaging member 115. Pivotally mounted as by a pin 116 within a slot provided proximate an end of the member 115 is a gripper 117 which has integrally along one edge a projecting segment 118 and along its opposite edge a camming surface 119. A cam follower or ball 120 is disposed within a passageway 121 provided within the member 115, and said cam follower is free for shifting within said passageway when the piston rod 122 and integral pistons 123 are moved under the influence of pressurized air that is released into the cylinder 124. When air pressure forces the cam follower 120 into tighter contact against the camming edge 119 of the gripper 117, the gripper is caused to pivot in a counterclockwise direction until the segment 118 engages the top of the trailing edge of the blank material inserted within the indented portion 125 of the member 115. The gripper is normally biased pivotally upward by means of a spring 126. The function of the gripper 117 for retention of the edge of the blank material is useful during the advancing, sequential cutting, and final cut of the blank material by the shear S and especially so when only a narrow piece (to become scrap) of the blank stock being sheared remains on the table 1 side of the shear. Fastened approximate one end of the arm 110, as at 127, is a spring 128 which attaches at its other end to the upper portion 129 of the member 115. Through the natural tension of the spring 128 the blank engaging member 115 is normally biased to its greatest extent toward the shear. It can be seen that pressurized air enters the cylinder 124 of the blank engaging member 115 by means of an air line 130, and said air line attaches to a solenoid operated valve 131 provided on the beam 32, as shown in FIGURE 5.

The pusher member 132, revealed in FIGURE 7, is similar in construction to the pusher members 90 as previously described, but it incorporates the added feature that it may be extended a slight distance ahead of the other pusher members as the delivery assembly advances towards the shear S. The pusher member 132 comprises an arm 133 which is integral with a clevis 134 and pivotally mounted as by a pin 135 to a mounting member 136. The member 136 is secured to the beam 32. Extending from the other end of arm 133 is an integral shaft 137 which is disposed for telescopically sliding within the sleeve arm 138. The sleeve arm connects with a clevis 139 which is pivotally mounted by means of a pin 140 to slot 141 for slidable movement with respect to the block 142 affixed upon the top of the blank engaging member 143. A compression spring 144 is provided within the slot 141 and exerts a force against the pin 140 for compelling it to normally remain at one end of said slot. A second pin 703 is connected radially to the pin 140 and inserted within the spring 144 for retaining it within the slot 141. When the member 143 independently slides with respect to its sleeve arm against the bias of spring 144, pin 703 will slide within the passage 704 provided in block 142. The blank engaging member is provided at one end with a frontal slanting edge 145 which is disposed slightly upward from an indented portion 146. Extending down from the bottom surface of the sheet engaging member is a runner 147 which slidably engages within the slideway 148 provided in a rail 26. Attaching proximately to the end of the sleeve arm 138, as at 149, is a spring 150 with said spring attaching at its other end to the upper portion 151 of the blank engaging member 143. The tensive effect of the tension spring 150 along with the resilient force of the compression spring 144 normally biases and holds the blank engaging member at its furthest point ahead of the sleeve arm 138. Attached to the arm 133 by means of a bracket 152 is a single acting spring return air cylinder 153, having a piston rod 154 extending outwardly centrally from one end thereof. The piston rod 154 connects to a shaft 155 which is pivotally attached as by a clevis 156 and a pin 157 to a bracket 158. The bracket 158 is mounted to the sleeve arm 138. Pressurized air is conveyed to the cylinder 153 through the air line 159 and said line connects to a solenoid valve 160 which is mounted proximately at one end upon the beam 32, as seen in FIGURE 4. When air under pressure is delivered to the cylinder 153, it exerts a force upon a piston rod 154 and shaft 155 effecting their extension a fixed distance. This extension concurrently causes a widening between the arm 133 and the sleeve arm 138, which thereby necessarily causes the sheet engaging member 143 to be extended approximately an equivalent distance. It should be recognized that since only the pusher member 132 is provided with this means for extension, it is the only pusher member that is advanced a set distance ahead and out of alignment with the remaining pusher members 90 and 109. Advancing this pusher member ahead of the remaining pusher members as described, effectuates an alignment of the blank material during its delivery to the shear and during the cutting operation.

To the frontal portion of the shear bed 25 of shear S there is provided a lateral feed F, as disclosed in FIGURE 13. This lateral feed is useful in assisting in the alignment of the blanks of material when they are deposited upon the delivery table just prior to the cutting operation. The lateral feed F comprises a cylinder 161 to which is delivered pressurized air by way of an air line 162 and a solenoid operated four-way valve 163. A solenoid operated valve 163 connects proximate and opens into one end of the cylinder 161, and an air line 705 connects to the opposite end of said cylinder. When it is desired to operate the lateral feed, air under pressure is released from the solenoid valve and into the proximate end of the cylinder, but to retract the lateral feed, pressurized air is conveyed through line 705 to the opposite end of said cylinder. A piston (not shown) contained in the cylinder 161 attaches to a shaft 164 which is integral with a rack 165 that contains gear teeth upon its lower surface. The rack is disposed for lateral shifting within the guideways 166. The cylinder and rack are stabilized by means of the framework 167 which is structurally supported by means of bracings 168 to the underside of the shear bed 25. A conventional oil controlled speed reducing cylinder 169 cooperates with a shaft 170, which is integral to the rack 165, and provides means for regulating the speed at which said rack is laterally shifted as during operation of the lateral feed F. A gear 171 intermeshes with the gear teeth provided on rack 165 resulting in the rotation of said gear and its associated sprocket wheel 172 when said rack is laterally shifted by functioning of the cylinder 161. Said gear and sprocket wheel are properly journalled to the framework 167 which provides for a stationary rotation of these members. An endless continuous link chain 173 engages with the sprocket wheel 172, and additionally, engages a pair of idler sprockets 174 and 175 which are pivotally mounted for free rotation to the shear bed 25. Referring to FIGURE 14, it can be seen that the link chain 173 is spliced so as to accommodate a slide member 176. One end of the slide member 176 is formed into an integral bracket like arrangement 177 and is disposed for holding a spindle mounted roller 178 which is arranged for extending slightly elevated above the surface of the delivery table 1 so as to engage the side edge of any sheet material resting thereon and push it in a direction generally parallel with the shear toward the side of table 1, nearest the reader in FIGURE 2. At the side of the shear bed 25 remote from the reader in FIGURE 2, there is a bracket 179 which mounts a compression spring 180 horizontally disposed that engages the back side of the slide member 176 to prevent its further movement after it has returned from having laterally shifted a piece of blank material across the delivery table 1 (see also FIGURE 13). To facilitate the movement of the slide member 176 of the lateral feed F, there is provided a transverse slideway 181 (see FIGURE 2) which accommodates the slide member 176 for guiding its travel across the table 1 as during operation. This slideway 181 is fixed flush with the upper surface of both the shear bed 25 and the delivery table 1 so as to prevent any obstruction to the sliding movement of the blank material thereacross. A cross rail 182 having a transverse slideway is provided on the delivery table 1 and may likewise accommodate a lateral feed assembly for assisting in the operation of shifting larger size blank sheets of material during their alignment pending transfer to the shear.

When the size of the untrimmed and uncut blank material that is delivered to the table 1 for the purpose of being aligned and advanced to the shear S is of a width somewhat less than one half the lateral dimension of the delivery table 1, then it may not be necessary that the slide member 176 of the lateral feed F move transversely across the entire width of the table. Consequently, there is provided a lateral feed center stop 183 which is mounted to the front of the shear bed 25. This center stop comprises a bracket 184 which is connected to the shear bed 25, and which has pivotally mounted thereto a linking member 185 that connects to a plate 186. The plate 186 has projecting from one of its sides a compression spring 187. Attached to the linking member 185 is a projecting segment 188 which has pivotally mounted thereto a clevis 189 that attaches to a piston rod that extends inwardly of the cylinder 190. The cylinder 190 is a single acting spring return cylinder, and is pivotally connected by means of the clevis 191 to the finger 192 projecting from the shear bed 25. When air is conveyed to the cylinder 190 through the solenoid operated valve 193 by means of the air line 194, the piston rod of the cylinder will force the plate 186 and its associated compression spring 187 to be pivoted upwardly a quarter turn until the compression spring is aligned upon the upward surface of the slideway 181 and may there engage and prevent the slide member 176 from moving transversely past this center section of the shear S. Likewise, when it is desired that the slide member 176 be allowed to traverse the entire width of the shear bed 25, then the center stop 183 may be repivoted downwardly below the surface of the delivery table and shear bed and therein be retained nonoperative, and fail to obstruct the slide member 176, nor prevent its continued movement to the far side of the shear bed.

Also revealed affixed to the frontal portion of the shear bed 25 are a series of valve means that supply regulated pressurized air to an air operative motor 195, for turning its mounted wheel 196. (see FIGURES 13 and 15). The wheel of the air motor may be constructed of any resilient or cushioning type material, such as rubber, neoprene, or the like, and when in operation is elevated so that its upper peripheral edge is disposed just slightly above the surface of the delivery table 1 so as to contact and rub against the under surface of any rough-cut-blank deposited upon the said table and thereby assist in its lateral shifting and alignment. Air under pressure is conveyed through a lubricator 197 and through a line 198, and after being filtered therein, is further conveyed through the air line 199 to a solenoid operated four way valve 200. When the air motor 195 is to be operated, the valve will provide for a passage of air through the line 201 to a cylinder 202. Cylinder 202 is attached to motor framework 203, and said framework is rigidly secured to one or more of the rails 26 of the delivery table. The air operated motor 195 is slidably mounted for vertical movement within the guideways 204 of the framework, and upon the admission of air under pressure into the bottom of the cylinder, its internal piston and piston rod (not shown) forces the motor and attached wheel from its inactive position normally below the level of the table 1, upwardly so that said wheel will be slightly elevated and disposed for engaging the under surface of the blank material B to assist in its transfer across said table. Air line 205 joins with the line 201 at the junction 206 so that a portion of the pressurized air may be conducted to the motor 195 for providing the air pressure necessary to induce a rotation of the wheel 196. Line 207 connects with the value 200 and can convey pressurized air directly to the cylinder 202 to effect a lowering of the air motor when it is desired to withdraw it from use.

Figure 15:
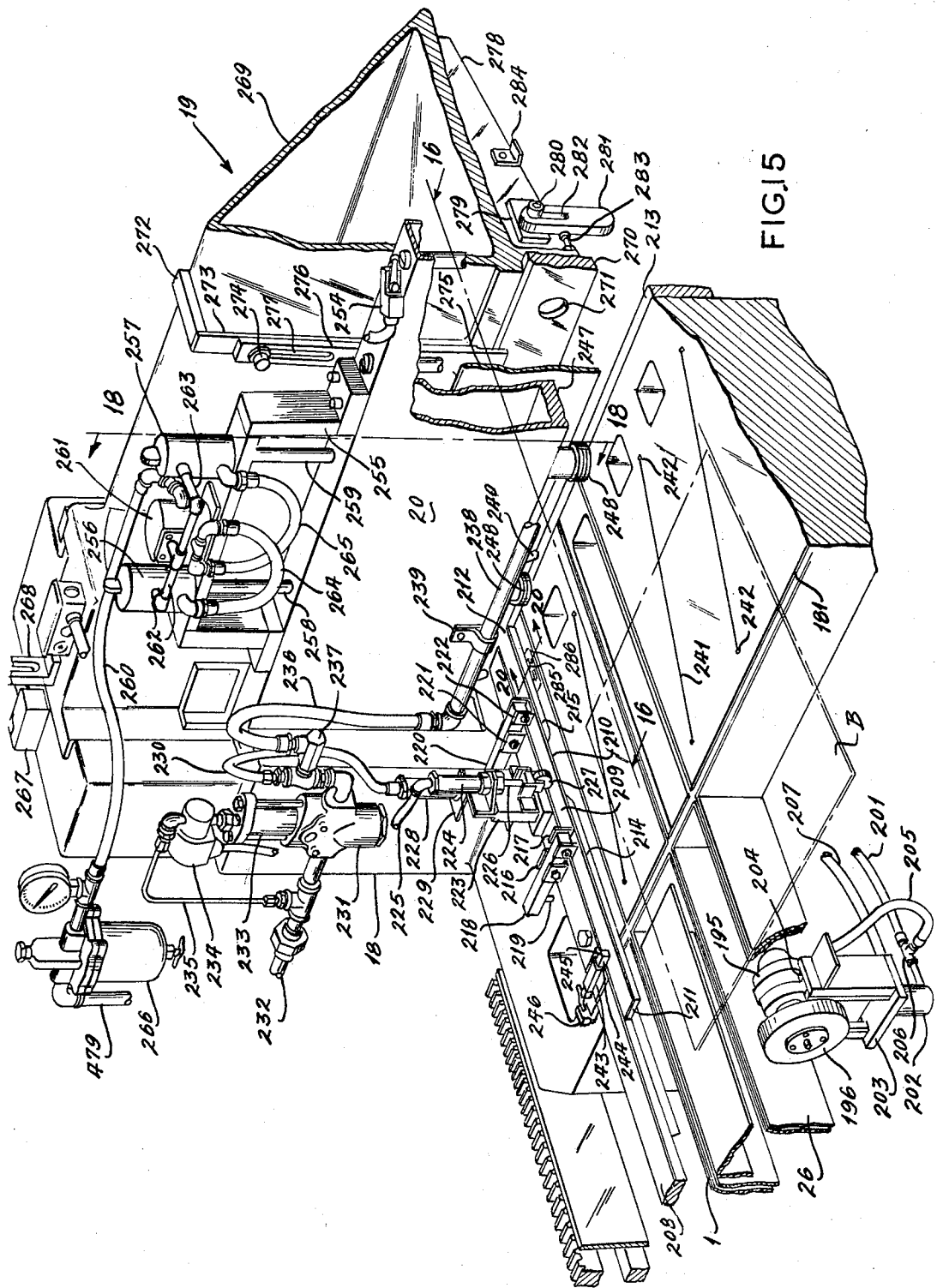
FIGURE 15 is a fragmentary view of a frontal portion of the shear and associated parts.

There is connected approximately along one side the entire length of the delivery table 1 and the shear bed 25 a straight edge 208 which is provided to be engaged by and for aligning a side of the blank material B as it moves laterally across said table and bed primarily by means of the force of lateral feed F (see FIGURES 2 and 15). A catcher member 209 is double pivotally hinged to the straight edge at a position substantially upon the shear bed 25. The catcher member 209 comprises a bar 210, constructed of steel or the like, which extends from an end 211 which overlaps the forward end of a said bed, to its other end 212 which is located proximately upon the stationary shear blade 213. Attaching to the underside of the catcher member 209 are a pair of cushioners 214 and 215, which are fabricated from any soft but sturdy material, such as vinyl or the like, and are useful for engaging and reducing the speed of lateral movement of the blank material as it is forced by the action of the lateral feed F and air motor 195 into engagement and alignment with the straight edge. Also, the catcher member having an under surface of vinyl like material prevents the blank material from being scratched, scarred, or nicked as it advances towards the straight edge, and further eliminates the rapidly moving blank from detrimentally ramming against the same. By use of this catcher member 209, an adjusted amount of force is exerted downwardly upon a blank material that is inserted intermediate said catcher member and the shear bed 25. This force induces a slight resistance against shifting of the blank material as it advances towards the shear for the cutting operation, and this resistance necessarily causes the blank to be disaligned from the straight edge, until the leading edge of the blank finally engages target sensors for actuating the shear into a cutting cycle. It has been found that to acquire a more proper squaring of the blank material as during the trim and regular cuts by the shear, the blank material may be induced first into alignment against the straight edge by means of the lateral feed F, and retained so until trimmed, then shifted into disalignment during further advancement toward the shear such as during the remaining successive cuts with such disaligning caused by means of the friction created along one side of the blank by the catcher member 209, and then again realigned by contacting against a back guage just prior to the cut by the shear.

Pivotally mounted to the top surfaces of the catcher member and straight edge by means of brackets 216 and 217 is a link 218. The double pivotal action of this link acquired by means of its being dual bracketed provides for an untilted and near horizontal raising or lowering of the catcher member and allows for complete engagement of the undersurface of the cushioning members with the blank sheet material as it slides thereunder. A stop 219 prevents the link from pivoting a distance greater than necessary for allowing the remaining trimmed scrap pieces of blank material to be released or ejected off of the shear bed. A second double pivoted link 220 is hinged by means of brackets 221 and 222 to the top portions of the straight edge and catcher member, and functions similarly in performance to the link 218.

It is desirable to maintain an adjusted the balanced amount of downward force upon the catcher member 209 and have sufficient pressure constantly maintained between its cushioners and the surface of the shear bed so that the speed of the blank material located therebetween may be effectively reduced as its leading side edge moves into contact with the straight edge. There is secured to the top surface of the straight edge by means of framework 223 an air regulator (not shown) and cylinder 224. Air is conveyed to said cylinder by means of the line 225 and acts upon a piston and rod 226 contained in the cylinder for compelling their movement downward. Rotatably mounted to the bottom end of the rod is a roller 227 which is normally maintained in constant contact and biases downwardly upon the top surface of the catcher member 209. The degree of force exerted by the roller upon the catcher member is controlled by the pressure of the air allowed to pass an adjusted air regular and into the cylinder.

When it is necessary to relieve the pressure exerted upon the catcher member 209, such as when it is desired to release the last remaining piece of scrap after the said blank has been dimensionally cut, the extended portion of lever 220 is forced to pivot downwardly and thereby effectively raise the catcher member from its pressure contact upon the blank material and the shear bed. A cylinder 228 is secured by means of bracket 229 to the framework 18 of the shear, and a cylinder rod (not shown) of the cylinder is aligned vertically for exerting a force upon the extended portion of the lever 220. Air is conveyed to said cylinder by means of the air line 230 which connects with a valve 231. Air passes to the valve 231 by means of air line 232, which receives the pressurized air from the main air manifold 702. Communicating with the air valve 231 is a time control valve 233 which is provided for furnishing a periodic regulation of the pressurized air that flows through said valve 231, which resultingly determines the exact moment at which a force is to be exerted upon the lever 220 for effectively raising the catcher member 209. An electrically controlled solenoid 234 connects with the time control valve and upon its energization cooperates in conjunction with said valve 233 to initiate its function of maintaining the valve 231 open to effect the desired catcher lifting operation. The supply of air that is needed to render the control valve 233 operative is shunted through an air line 235 from the line 232.

It is to be noted that an air line 236 attaches as at the juncture 237 to the line 230, and communicates at its other end to a scrap ejecting air manifold 238. The air manifold is attached by a series of clamps, as at 239, to the downward edge of the blank material hold down 20, and there are provided a plurality of uniformly spaced nozzles 240 connecting internally to the air manifold for the purpose of directing jets of air under pressure toward the area just proximately forward of the cutting edge of the stationary shear blade 213 for the purpose of assisting in the removal of the last remaining piece of trimmed scrap material that may be left at the end of the blank cutting operation.

There are provided upon the upward surface of the shear bed 25 a series of parallel and diagonally aligned wires or rib like members. These wires 241 are drawn tightly through the openings 242 provided in the top surface of shear bed, and may be fastened to its underside so as to be permanently retained in close contact with said shear bed surface. Alternatively, the wires may be bent perpendicularly at their ends and inserted into the openings 242 provided on the shear bed 25 with the upper surface of the shear bed. The wires are of a sufficient diameter, preferably a diameter of approximately .040″ to .050″, so as to emit a thin film of air intermediate the shear bed surface and the passing blank as the latter is being advanced to the shear. When the blank material is advanced over the shear table and shear bed toward the shear S, often times, an oily coating or mill lubricant that had adhered to the surfaces of said blank functions to create a vacuum between it and the surface of the shear bed. A vacuum of this nature has a tendency to impede the normally easy process of advancement of the blank material. By incorporating the wires 241, or other rib like members upon the shear bed as disclosed, the vacuum is prevented from developing, and the blank material B is free to slide uninterruptedly upon the shear bed toward the shear.

Mounted upon the straight edge 208 by means of a bracket 243 is a spring biased lever 244 which projects at one end through a cut away portion 245 provided in the catcher member 209. The other end of said lever is disposed for engaging and actuating an electrical switch 246 which is mounted to the shear bed. It is to be noted that the lever 244, which is maintained normally out of contact with the switch, is disposed in alignment with the slideway 181 of the lateral feed F, and when the blank material B is advanced laterally to add the straight edge by said lateral feed, a side of the blank engages and depresses the lever 244 for actuating the switch 246. The energizing of this switch effects various components of the circuitry of the shearing apparatus as will be discussed.

The blank material hold-down 20, as briefly previously described, has a reciprocal vertical sliding movement with respect to the shear framework 18, and is comprised of a housing 247 which retains a series of equally spaced spring loaded plungers 248 that function when operated to press the blank material B tightly against the shear bed to prevent any slippage and resulting uneven cutting during the shearing operation. As revealed in FIG. 19, each plunger 248 is attached as by a lock nut 249 to a rod 250. The shaft portion 251 of the plunger is disposed for sliding movement within a bore like opening 252 provided in the bottom surface of the housing 247. A spring 253 normally maintained in compression is disposed within the housing and is mounted surrounding the rod 250. One end of the spring binds upon the top portion of the plunger 248 and forces it downward with respect to the housing 247 of the hold-down 20. As the hold-down 20 slides downwardly within the shear framework into engagement for holding the blank material tightly against the shear bed, the plungers 248 are forced into the housing 247 against the natural compressive resiliency of the spring, as revealed in the broken outline. The binding force provided by the increasingly compressed spring has a tendency to increase the pressure exerted by the plunger 248 upon the blank material for holding it secure and free from a slippage during cutting. When the rod 250 of one of the plungers 248 is forced upwardly in the housing 247 as when the hold-down is lowered to engage the blank material, said rod is aligned for actuating a switch 254 that is mounted to the top of said hold-down 20. (See FIG. 15.)

One or more of the plungers 248, proximate that end of the hold-down nearest the side of the shear having the straight edge 208 and other blank aligning fixtures, are equipped to function as prehold-downs. These prehold-downs, in addition to having plungers that function by means of the compressive spring action for engaging the blank material, also extend downwardly by means of pressurized air to initially engage the blank just prior to the remaining plungers of the hold-down. These prehold-downs are constructed to include a plunger 248 affixed to the rod 250 which is disposed for slidable movement with respect to the housing 247 (see FIGURES 15 and 18).

The compression spring 253 is mounted upon the rod, and normally biases the plunger against movement inwardly into the interior of said housing. Provided on top of the hold-down 20 is a framework 255 which supports a pair of air cylinders 256 and 257. The upper extensions 258 and 259 of each rod 250 project through the framework 255 and connect respectively with the air cylinders 256 and 257. When pressurized air is conveyed through the air line 260 it passes into a solenoid operated four way valve 261. When the solenoid is selectively energized for the purpose of opening its valve 261, air will be released through the lines 262 and 263, respectively, into the upward portions of the cylinders 256 and 257, and force the rods 258 and 259 and their associated plungers downward tightly upon the blank material on the shear bed. The plungers may be elevated by the emission of pressurized air through the operation of the solenoid operated valve 261 and into the air lines 264 and 265 for passage respectively to the downward portions of the cylinders 256 and 257 whereby the rods 258 and 259 and attached plungers are elevated, thereby releasing the sheet material. An air line lubricator 266 is provided in the line 260 for the purpose of providing for the dissemination of a fine mist of oil into the pressurized air passing therethrough which facilitates the working of the valve and cylinders and also preserves them.

Mounted upon the top of the shear framework 18, as revealed nearest the reader in FIGURE 2, is an electrical switch 267 which is actuated during the vertical rise of the shear ram 19 by a bracket 268 connected to said ram. When said switch is opened, the prehold-downs are elevated and freed from their binding the blank material to the shear bed. Mounted upon the top of the shear framework 18, remote from the reader as disclosed in FIGURE 2, are a pair of electrical switches 706 and 707. As the shear ram 19 is raised after each cut, switch 706 is actuated which provides for a release of the braking mechanism 84 of the delivery assembly D, thereby allowing the delivery assembly to freely move toward or away from the shear. Switch 707 is also mounted to the shear framework 18, and is actuated by the shear ram 19 when it reaches its upper limit of stroke as when it is desired that the shearing apparatus operate on the "once action basis" and cut the blank material to wider dimensions such as during the split sequence of operation.

The shear ram 19, as revealed in FIGURE 15, comprises a ballast member 269 which has secured proximately its lower forward edge a moveable shear blade 270. The shear blade is affixed to the member 269 by means of common fasteners, such as by use of one or more bolts 271, and is mounted at a slight rake angle that is provided in the member 269 along its entire length with respect to the normally horizontal stationary blade 213 for the purpose of facilitating the cutting operation of the blank material. There is connected to the frontal portion of the ballast member 269 a series of equally spaced frames 272 having a vertical support 273 and an integral projecting finger 274 extending therefrom. Attached for vertical sliding movement with respect to the ballast member and the movable blade is a guard plate 275 which is integral with a slide rail 276. Contained in the slide rail is an elongate slot 277 through which the finger 274 projects, allowing for the guard plate 275 to be vertically disposed with respect to the ballast member, so that as the shear ram is lowered during the cutting operation, said guard plate will engage upon the blank and the upper surfaces of the shear bed 25 before the movable blade 270 and the stationary blade 213 cut said blank material. As the movable blade and ram continue further downwardly during the cutting operation, the guard and its associated slide rail 276 will remain stationary. The purpose of the guard plate is to prevent any foreign objects from entering intermediate the shear blades during the cutting operation. It is a further function of the guard plate to prevent the blank material yet remaining upon the shear bed 25 after each cutting operation from getting caught or becoming bound upon the elevating ram and its movable shear blade.

Near the central section of the shear ram 19 by a flange 278 attaches integrally to the bottom of the ballast member 269. Connected to said flange is a mount 279 having a projection 280 extending laterally therefrom. A scrap deflecting member 281 having an elongate slot 282 is swingably mounted upon the aforesaid projection. This scrap deflector is useful in preventing any trimmed or scrap piece of blank material from undesirably swinging and falling too rearwardly of the shear ram, thereby bypassing the scrap gate opening and being deposited on the conveyor along with the other precision trimmed and cut pieces of material. The scrap deflector is prevented from pivoting too forward, and detrimentally becoming caught between the shear blades, by means of a stop 283 which also attaches to the ram. A bracket 284 is connected to the flange 278 and is provided for retaining the scrap deflector horizontally when it is no longer needed in the cutting operation of the shear, such as when the blank material is being split and not trimmed, or when the shear blade necessitates a change.

Figures 20, 21:
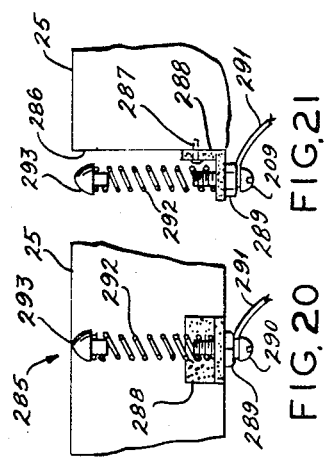
FIGURE 20 is a front view of the continuity switch taken on line 20—20 of FIGURE 15.
FIGURE 21 is a side view of the continuity switch revealed in FIGURE 20.

There is provided within the shear bed 25 a continuity switch 285. (see FIGURE 15) This continuity switch is set within an opening 286 provided in said shear bed. Attaching to the side of the shear bed 25 by means of a fastener 287 is an insulated and nonelectrically conductive bracket 288. (See FIGURES 20 and 21.) The bracket 288 has mounted to it a lock nut 289 which is engaged by a screw 290. The screw attaches one end of a circuit line 291 into electrical contact with a vertically disposed spring 292. To the upper end of said spring there is mounted a contact probe 293, which is centrally disposed within the opening 286. The probe does not communicate with any part of the shear bed 25 around the sides of the opening 286, and is elevated just slightly above the upward surface of said shear bed so that any blank material passing over it will be in constant contact with both the contact probe and the surrounding shear bed for the purpose of completing an electrical circuitry that provides for a reduction in the speed of forward movement of the said blank as it advances towards the shear.

Figure 17:
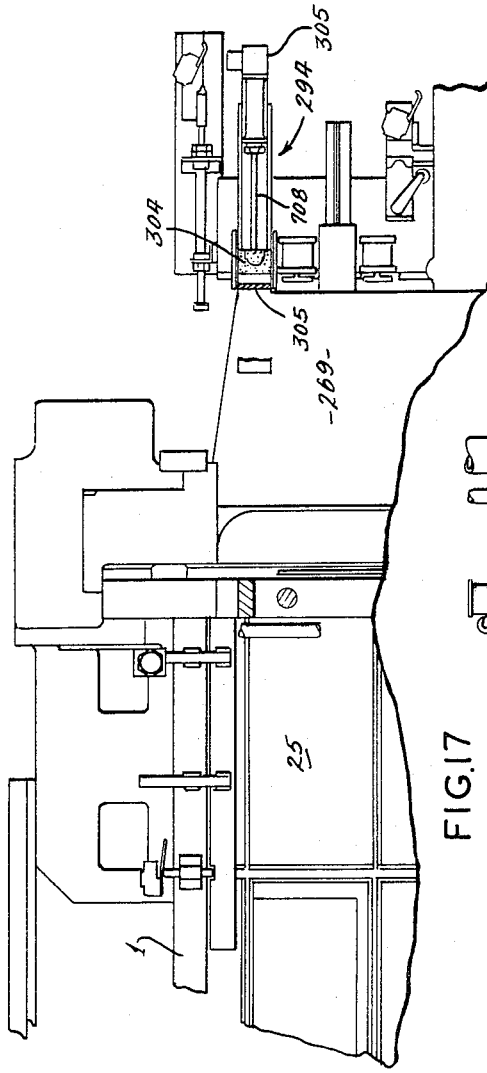
FIGURE 17 is a fragmentary sectional view of the shear taken on line 17—17 of FIGURE 16.
Figure 16:
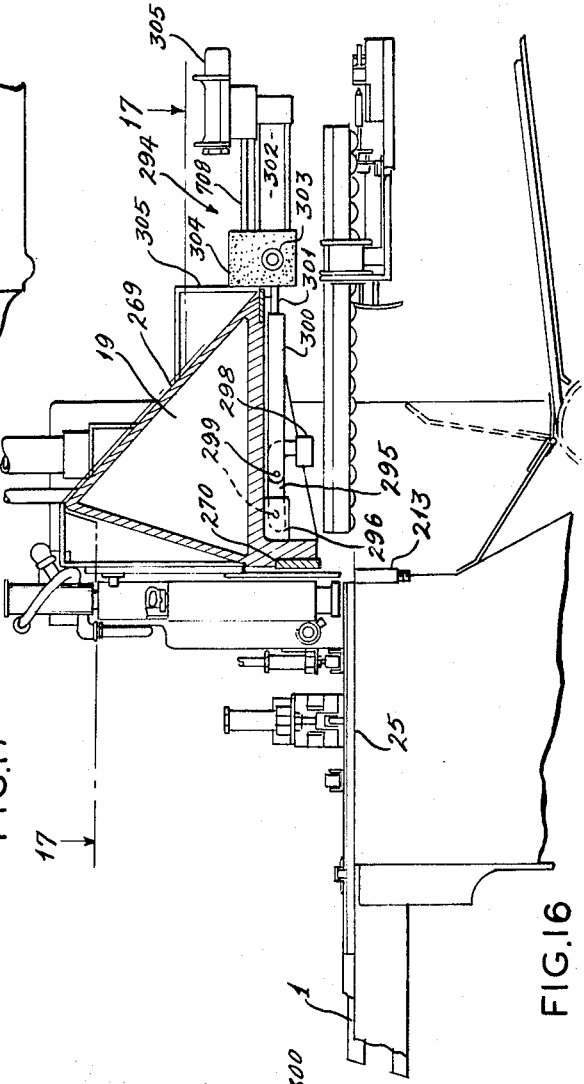
FIGURE 16 is a fragmentary sectional view of the shear taken on line 16—16 of FIGURE 15.

Referring to FIGURES 16 and 17, a trim sensor 294 may be pivoted and disposed for being contacted by the leading edge of the blank material as it just initially advances past the shear blades, and functions to stop said blank so that a fractional amount of its leading edge may be trimmed and properly squared. This trim sensor is comprised of an insulated arm 295 that is pivotally mounted at one end to a bracket 296 which is integral with the underside of the shear ram 19. (see FIGURES 22 and 23) The downward extension 297 of the arm 295 is electrically conductive, and connects with a plate 298 which, when the trim sensor is pivotally maintained downwardly in operative position, will be approximately aligned with the upper surface of the delivery table 1 and shear bed 25 so that any blank material moving thereupon towards the shear will eventually slide through the spacing intermediate the shear blades and contact the forwardly disposed side of said plate 298. Since the trim sensor 294 is in the nature of a continuity switch, when the leading edge of the blank material engages the plate 298, electrical circuity is completed that functions to immediately stop any further movement of the blank material until its leading edge has been trimmed by the shear. Pivotally attached to the extension 297 of the arm 295 by means of the pin 299 is an extension clevis rod 300 which connects with a cylinder rod 301 of cylinder 302. One end of the cylinder 302 pivotally mounts by means of pin 303 to an insulated bracket 304, and said bracket connects with a frame member 305 that attaches to the rearward edge of the ballast member 269 of the shear ram 19. The cylinder 302 is electrically insulated from the shear ram, and attaches to one lead-in of a circuit line (not shown) so that the trim sensor may complete electrical circuitry when the leading edge of the blank material sliding over the surface of the shear bed makes contact with the plate 298. A combined solenoid operated four way valve 305 is secured to one end of the cylinder 302 and provides for the release of pressurized air into the proximate end of the cylinder while simulaneously exhausting the air from the opposite end thereof for pivoting the trim sensor switch into operative position. To raise the trim sensor into inoperative position, the solenoid valve 305 may be energized for releasing air through line 708 and into the opposite end of the cylinder 302, thereby retracting the rod 301 and clevis rod 300 for effecting an upward pivoting of the arm 295.

Figure 3:
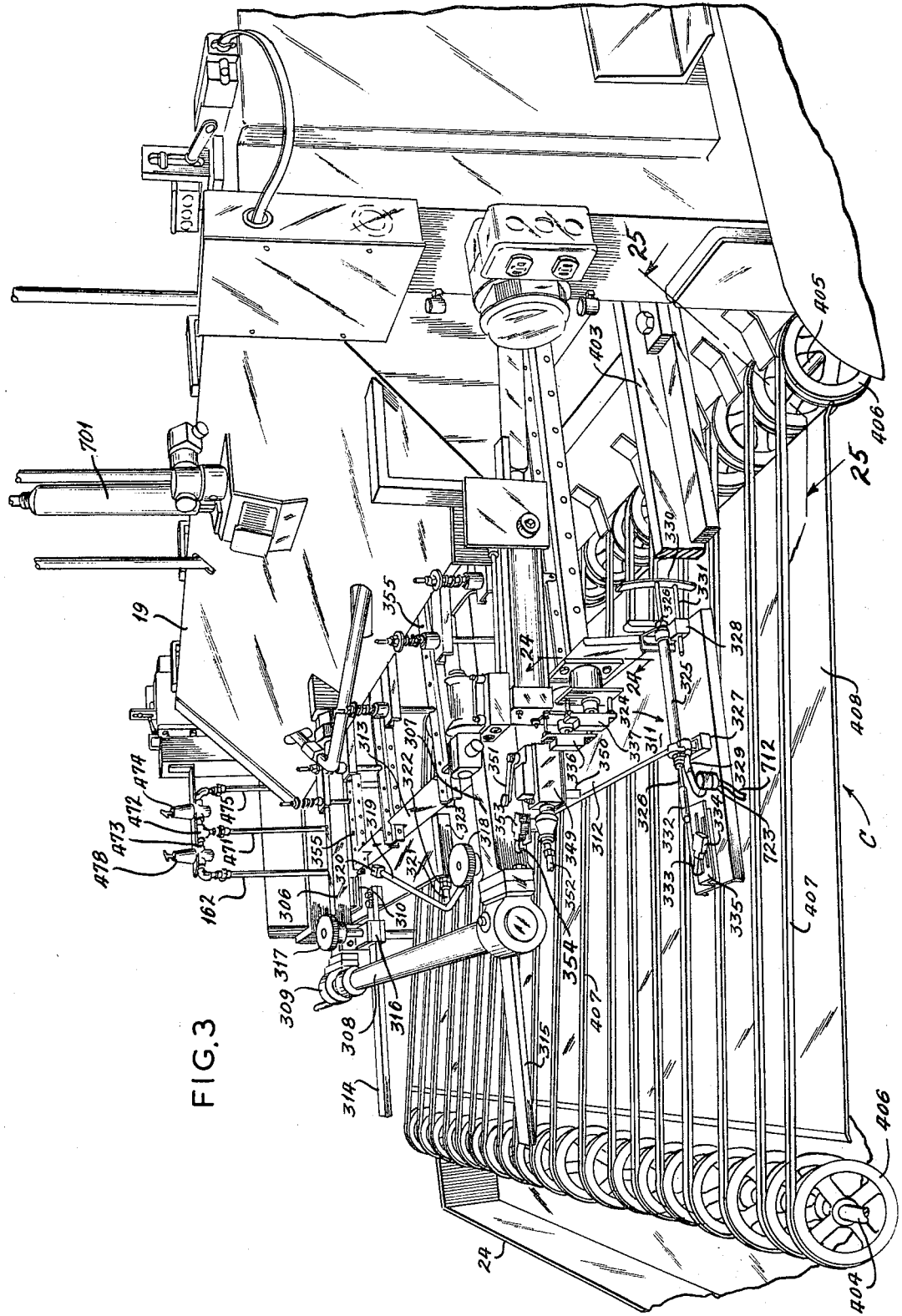
FIGURE 3 is a perspective partial side view of the shear, conveyor, and stacker depository of the shearing apparatus.

Referring to FIGURE 3, attached to the underside of the shear ram 19 are a pair of back gauge brackets 306 and 307, each containing internally a worm screw (not shown). Journalled to the back end of said brackets is a laterally disposed shaft 308, connected by worm gears to each of the aforesaid worm screws, and having a handle 309 at one end which may be rotated providing simultaneously for the rotation of the worm gears and the interengaging worm screws contained within the brackets 306 and 307. Upon each worm screw there is mounted a slide nut 310 which has mounted thereto the back gauge 311, so that when the worm screws are rotated, as previously described, the back gauge may be shifted either toward or away from the shear S a precise distance. The back gauge is of angular configuration and comprises a horizontally disposed member 312 having an integral vertical member 313 on its frontal edge. Fastened to the member 312 are a pair of extension arms 314 and 315 each projecting through a bracket, as shown at 316, which are secured to the back gauge brackets 306 and 307. Each of said brackets is provided with set screws 317 and 318 which are disposed for tightening to the extension arms held by said brackets, and thereby fix the back gauge 311 at the desired setting a predetermined distance away from the shear S. A stress bar 319 attaches, as at 320, to the back gauge 311, and has an integral rod 321, that bisects the said bar's midpoint angle, and attaches to the adjustment nuts 322 associated with the mount 323. This stress bar may be adjusted for flexing and straightening the back gauge when it becomes warped or bent as through continuous usage.

Attached to one end of the back gauge is a speed reducing sensor 324 comprising a cylinder 325 which contains a double extending cylinder rod 326. The cylinder 325 is secured to the back gauge by means of a pair of mounts 327 and 328. Pressurized air is conducted through a solenoid operated valve 723 and to the cylinder by means of an air line 329. To the forward end of the cylinder rod 326 there is attached a slightly arcuate plate 330 which is maintained vertically disposed by means of the guide rod 331 connected to the lower end of said plate, and said guide rod is in sliding contact through the mount 328. The other end of the cylinder rod 326 is integral with a contact member 332 which is aligned for engaging a contact spring 333 of an electrical switch 334 for the purpose of completing electrical circuitry which functions to reduce the speed of the oncoming blank of material just before it reaches the back gauge. The electrical switch 334 is mounted upwardly from the member 312 by means of an angle plate 335 so as to maintain alignment for cooperating with the contact member 332.

Mounted to the plate 312 are a pair of target sensors 336 and 337 which when actuated by the leading edge of the blank material B are forced into closed contact and provide the means for actuating the shear into its cutting operation. Each target sensor, as revealed in FIGURE 24 is mounted upon the back gauge 311. A pair of fasteners 338 secure the flanged portion 339 of a housing 340 to the back side of the vertical member 313. Provided through the central opening in the housing 340 is a shaft 341 which acquires near frictionless shifting by means of the bearings 342. Connected to the frontal end of the shaft 341 is a plate 343 that is disposed for being contacted by the leading edge of the blank material as it advances through the shear and approaches the back gauge. Secured to the back portion of the housing 340 by means of the bracings 344 is an enclosed electrical switch 345 which provides for electrical contact between the circuit lines 346 and 347 when the spring biased plunger 348 is compelled inwardly of the switch by means of movement in its direction of the shaft 341. A compression spring (not shown) contained internally within said switch for biasing said plunger 348, normally maintains the switch out of electrical contact, and forces the shaft 341 and its associated plate 343 forward of the back gauge 311.

Provided upon the back gauge 311 and attached upwardly from the horizontal member 312 is an electrical switch 349 which is mounted upon a pair of spacers 350. This switch is provided with a pivotal arm 351 which normally biases the switch closed and energized for inducing a functioning of the blank material striker 701 of the invention. When the back gauge is adjusted and brought to a set distance away from the shear blades, the arm 351 of the electrical switch will pivot by means of engaging a camming surface (not shown) on the bracket 307 and break the circuit for preventing a further function of the striker 701. Other functions of this electrical switch 349 will be subsequently described. A circuit line 352 conveys electrical current to the switch 349. Also attached to the back gauge 311 adjacent the electrical switch 349 is a micro-switch 353 having a spring contact 354 which is biased into energization when the back gauge 311 is advanced to within a set distance, for example, two inches, from the shear blades. When this switch is energized, it functions to curtail any further operation of the speed reducing sensor 324 and maintains the advancement of the blank material through the shear blades at reduced speed, especially when the back gauge is set at close proximity to the shear blades, as when the shearing apparatus is adjusted to make cuts of the blank material at two inches or less.

A series of equally spaced magnetic holders 355 are provided stationarily fixed to the underside of the shear ram 19. Referring to FIGURE 27, these holders are comprised of a channel member 356 which have pivotally mounted thereto, by means of a series of pins 357 a plurality of magnetized rollers 358. These rollers are sufficiently magnetized so that they may retain approximately aligned to the surface of the shear bed a portion of the blank material as during the process of the final trim and cut of its back edge, or during the split sequence of operation. Extending upwardly from each channel member 356 is a rod 359 which projects through an opening provided in the bracket 360 that attaches to the aforementioned shear ram. A resilient spring 361 is provided upwardly from each bracket 360 and is mounted upon each rod by means of a washer 362 and fastener 363. A similar rod 364 and spring 365 are provided proximate the opposite end of each holder 355. The operation of these series of springs and rods provide some flexibility and cushioning during the function of the holders 355 while retaining the blank material for its cut, but develop sufficient vibration during the stroke of the shear ram 19 so as to generally disengage the retained blank for the latter's falling downwardly onto the conveyor C. Each end of said channel members projects freely through a corresponding slot 366 provided in the vertical member 313 so that they do not inhibit the shifting of the back gauge 311 when it is desired to move it toward or away from the shear. Occasionally, it may be necessary to provide additional holders for assisting in retaining the blank for cut by the shear, for example, as when the blank material is of a heavy gauge, or when the width of the blank is not sufficient to provide for its stable retention by a series of adjacent holders and proper alignment against the back gauge. For this purpose, an auxiliary magnetic holder 367 (see FIGURE 28) may be clasped to the horizontal member 312 of the back gauge 311 at any position where capable along its width to assist in the supporting function. This holder comprises a normally horizontally disposed bar 368 which is retained by a bracket 369 to a clamp 370. Extending downwardly from said clamp is a mounting member 371 which has pivotally connected to it by means of a pin 372 an arm 373. The arm 373 at its other end contains an adjustable screw 374 which engages with a base 375 so as to provide for its adjustment for tightly clamping upon the back gauge as during usage. Also pivotally mounted to the member 371 by means of a pin 376 is a clevis like structure 377 having a handle 378 projecting perpendicularly proximate its lower end so as to provide upon its downward forceful pivotal movement a securement of the clamp to the back gauge. There is provided within the bar 368 substantially along its length a slot 379 which is useful for accommodating a series of magnetic roller trams 380. Each of the magnetic roller trams is slidably mounted to the bar 368 by means of a channel member 381 which may be tightened to the bar at any position desired by means of a set screw 382. A pair of links 383 and 384 are pivotally mounted to each channel member, and said links also pivotally mount to an inverted channel 385. Since the ends 386 and 387 of the links are cam shaped, they engage with the upper surface 388 of the inverted channel to prevent a complete pivoting of the links into a vertical disposition. A series of magnetic rollers 389 are retained within each channel 385 by means of spindles 390 and are freely rotatable.

Provided on the ballast member 269 of the shear ram 19 is a blank material striker 701 which is useful for knocking any of the cut blank material from its magnetic engagement with the rollers 358 of the holders 355. The striker comprises a cylinder 391 which is pivotally mounted at one end to a bracket 392 that is fixed to an angle plate 393. The angle plate is connected to the inclined back surface of the ballast member 269 of the shear ram. A solenoid operated four way valve 394 regulates the periodic flow of pressurized air to the cylinder, and it is electrically energized by current that traverses through the electrical junction box 395. The cylinder has extending from its other end a rod 396 which connects, as at 397, to a cross bar 398, and said cross bar has secured to it a series of equally spaced vertical, downwardly extending rods 399. The broken line outline reveals that pressurized air released into the cylinder 391 has extended upwardly the rod 396 which provides for a raising of the entire striker above the level of the magnetic holders 355. The series of rods 399 extend through openings 400 provided through the ballast member 269, and are extended further through a series of sleeves 401 and openings provided on the ballast bottom wall. Attached to the lower end of each rod 399 is a cushioned knob 402 which upon the downward movement of the striker contacts the cut blank material to disengage it from its hold by the metallic rollers. Since the knobs 402 are reasonably soft in texture, they do not scratch or impair the surface of the blank material when striking it loose from the holders 355.

Mounted to the underside of the shear ram 19 is an extended straight edge 403 (see FIGURE 3) which is normally in perfect alignment with the shear table straight edge 208 when said shear ram is at rest and inoperative. This straight edge is of a sufficient length to provide for its extension at all times beyond the back gauge 311, and is useful for providing for continuous aligning of the blank material even as it is advanced beyond the shear blades of the shear S. Since this extended straight edge 403 is mounted to the shear ram 19, it will reciprocally vertically shift with said ram and back gauge 311 during each cutting cycle.

The conveyor C, revealed in FIGURE 3, comprises a pair of spaced apart axles 404 and 405, each having fixed thereupon a plurality of pulleys 406. A series of equally spaced continuous belts 407 are provided upon each set of aligned pulleys, and upon actuation of the conveyor, transfer any accurately cut blank material deposited thereon to its back edge for deposit into the stacker 24. A tray 408 having a width equivalent to the conveyor width is fixed just slightly below the upper strand of the belts 407, and thereby prevents the slippage of any blank through the conveyor before it is released from the conveyor and into the stacker.

Mounted upon the axle 405, as revealed in FIGURE 25, is a scrap gate 409 which when pivoted open during the shear trimming operation provides for the free fall of any scrap material downwardly into the depository 410. The scrap gate 409 is provided with a canted upper edge 411 which insures a uniform contact with the back side of the shear framework 18 as when the scrap gate is pivoted into closure. Fixed to the other edge of the scrap gate are a series of guide members 412 which direct the properly cut blanks of material onto the conveyor for immediate transfer. To each end of the axle 405 is journalled a bearing mount 413 that attaches by means of a support 414 to the edge of the scrap gate 409. Means for pivoting the scrap gate is provided by a solenoid operated four way valve 709 which directs pressurized air to a cylinder 415 that is mounted at one end upon the conveyor framework, having a cylinder rod 416 pivotally mounted to a lever 417 through the union of a clevis 418. The lever 417 attaches to a bearing mount 419 that is journalled upon the axle 405, and further attaches to an edge 420 of the scrap gate. To open the scrap gate pressurized air is released from the energized solenoid operated valve through air line 710 into the proximate end of the cylinder 415, which effects an extension of the cylinder rod and resulting opening of the scrap gate. To close the scrap gate, the solenoid valve is again de-energized and provides for the passage of pressurized air through line 711 and into the opposite end of the cylinder for retraction of the cylinder rod and closure of the scrap gate, such as during the routine cutting operation of the shear.

The back end of conveyor C terminates adjacent to a stacker 24 which uniformly collects the precisely sheared blanks of material as they fall from the conveyor. Referring to FIGURE 26, it can be seen that the stacker has an open compartment like appearance and comprises a back wall 421 which has a width approximately the over-all width of the shearing apparatus. The back wall 421 contains means (not shown) for connecting with an end plate 422, and said end plate integrally connects with a plate 423 which is normally maintained contiguously with a back gate 424. Extending upwardly from the plate 423 is an integral slanted portion 425 which has its top edge bent back into the formation of a hook like edge 426 for hanging upon the top edge of the back gate 424. The combination end plate 422 and integral plate 423 is provided at each side of the back gate 424, and because of their loose mounting upon said back gate they may be moved into either a narrow or wider width depending upon the width of the blank being cut by the shearing apparatus. During the adjustment of the end plates to a desired width, both the back gate 424 and the back wall 421 remain stationary. The entire stacker 24 for the convenience of transfer rests upon a pallet 427. The back gate 424 may be automatically elevated or lowered with respect to the conveyor C, so that the stacker may be properly positioned for accepting and collecting the sheared blanks of material. Means for elevating or lowering the back gate is provided by a cylinder 428 which has a cylinder rod 429 projecting downwardly therefrom and having a mount 430 attached to its lower end. The mount 430 is also rigidly connected to the downward edge of the back gate 424. The cylinder 428 is secured to a flange 431 which attaches to a sleeve 432 that is rigidly affixed to the stationary framework 433 of the shear. Journalled within the aforementioned sleeve is a guide rod 434 which has attached to its ends a pair of plates 435 and 436 that are affixed to the back gate 424. During the elevating or lowering of the back gate 424, the guide rod 434 is retained for sliding movement within the sleeve 432 and thereby maintains said back gate permanently affixed to the shear and shear framework proximate the back end of the conveyor C. When it is desired to elevate the back gate and end plate so as to bring them properly into alignment with the end of conveyor C, the pressurized air is conveyed through line 724 and into the manually operated valve 725, and released into line 726 for conveyance into the lower portion of the cylinder 428 to thereby effect a raising of the cylinder rod 429, plate 430, and associated back gate 424. Likewise, to lower the back gate and the attached end plate, the valve 725 may be regulated to provide for the passage of air through line 727 and into the upward portion of the cylinder, while simultaneously providing for an exhausting of the air from its lowermost portion. The stacker 24 may be raised or lowered, and its end plates widened or narrowed so as to properly accommodate and orderly collect the cut blanks as they are conveyed from the shear.

Attached to the side of the shear framework 18 upwardly from the gear compartment 22 is a shear switch 437 which functions when actuated to provide for the operation of the shear ram 19 and hold-down 20 (see FIGURE 2). The shear switch comprises an air cylinder 438 which by operation of a solenoid operated valve 439 has pressurized air released therein through an air line 440. A cylinder rod 441 is integral with a clevis 442 which pivotally mounts to a lever 443. The lever 443 connects to a second lever 444 which is pivotally mounted to a bracket 445 attached to the framework 18. The lever 444 has an opening 446 provided centrally therethrough, and pivotally mounted within said opening by means of the pin 447 is one end of a trigger rod 448. The other end of said trigger rod projects into the gear compartment 22, and when forced outwardly by operation of the cylinder 438 and the connecting levers, provides for a functioning of the internal gears and the operation of the shear ram and hold-down.

Also attached to the shear framework 18 proximate the area where the end 449 of the channel rail 29 connects to the side of the shear bed 25 are a series of switches that are disposed for actuation by means of the support 36 connected to the cover plate 33 of the delivery assembly D as it advances toward the shear near the end of its movement. When the switch 450 is included within the circuitry of the shearing apparatus, its actuation when engaged by the support 36 prevents the shear from trimming the trailing edge of the rough-cut blank B. It is sometimes desirable to limit the trim function of the shear, for example, as when it has been set up for operating under the "split sequence." When switch 451 is actuated by means of pivoting its arm as during passage of the cover plate 33 during movement of the delivery assembly D towards the shear, the solenoid operated value 77 is instantaneously energized and functions to reduce the rate of speed of movement of said delivery assembly as it forces the piece of trim cut from the back edge of the blank material off of the shear bed 25, and also prevents the pusher members from detrimentally ramming into the stationary shear blade 213 (see FIGURE 11). When the switch 452 is actuated by means of the cover plate 33 during the movement of the delivery assembly D towards the shear, the blank material striker 701 functions to shift downwardly for disengaging any of the cut material that may be retained and held by the magnetic holders 355. In addition, actuation of switch 452 energizes solenoid 234 which effects a raising of the catcher member 209 and directs jets of air from the manifold 238 for forcing trim scrap from the shear bed. Also, when said switch is depressed, the delivery assembly commences its return from the shear to the forward end of the delivery table 1.

Figure 29:
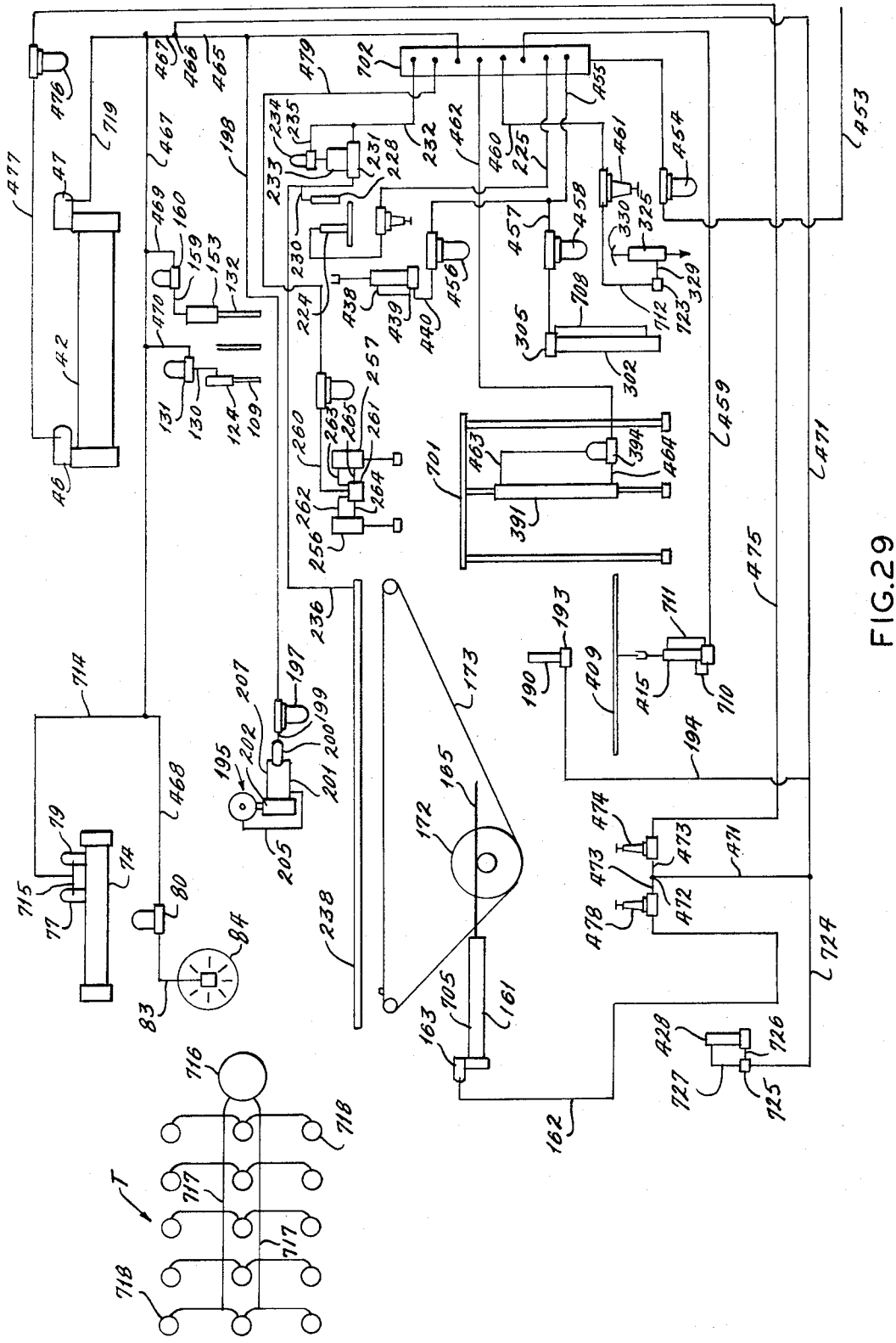
FIGURE 29 is a schematic diagram of the fluid flow lines, solenoid operated valves, and components of the pneumatic system employed in the operation of the shear and adjunct apparatus of the invention.

The main air manifold 702 which attaches to the side of the shear framework 18 directs pressurized air to various components of the shearing apparatus for the purpose of rendering them pneumatically operative. Referring to FIGURE 29, the main air manifold 702 is disclosed in relationship to the various air valves and cylinders to which it directs the pneumatic air pressure. Pressurized air, or house air as it is commonly called, is normally maintained at a pressure of approximately 80 p.s.i., and is conveyed through an air line 453, passes through an air filter 454, and then is conducted into the main air manfold 702. There are a plurality of air lines which connect with the main air manifold that provide means for directing and passing the pressurized air to the various parts of the shearing apparatus that operate under pneumatic pressure. Line 455 connects with the main air manifold 702 and passes a portion of the pressurized air through a lubricator 456 and subsequently through line 440 to the solenoid operated valve 439 of the shear switch 437 (see FIGURE 2). Whenever the solenoid operated four way valve 439 is electrically energized, pressurized air is exhausted from the rod end of cylinder 438 and allowed to pass into the opposite end of the cylinder 438 for producing a mechanical functioning of the shear switch, and resultingly cause the shear ram 19 and holddown 20 to be lowered into cutting operation. A partial amount of the pressurized air passing through line 455 is directed into an air line 457 and through a lubricator 458 for its eventual transfer to the solenoid operated valve 305 of the trim sensor 294 (see FIGURE 16). The solenoid operated valve 305 is a common four way type valve which when functioning provides for the passage of pressurized air selectively to either end of the cylinder 302 while exhausting air from the opposite end thereof rendering it operative in either direction. The solenoid operated valve 305 may be electrically energized for passing the pressurized air into the end of the cylinder 302 proximate said valve and cause the trim sensor 294 to be pivoted into operative position so that its electrically conductive plate 298 is set a fixed distance from the shear blade for providing a trimming and squaring of the leading edge of the advancing blank material. When it is desired to pivotally elevate the trim sensor 294 and render it inactive, the solenoid operated valve is de-energized for passing pressurized air through line 708 and into the opposite end of cylinder 302, while exhausting air from the other end thereof, thereby causing it to act in a reverse direction. In this manner, the charged plate 298 of the trim sensor will pivot approximately a quarter turn upwardly and into an inactive position under the shear ram.

Pressurized air is passed through the air line 225 which connects with the main air manifold 702. The air directed through the line 225 enters an air regulator 722 and cylinder 224 for the purpose of exerting a downward force upon the catcher member 209 (see FIGURE 15). The air regulator can be manually adjusted so that it may reduce the house air pressure down to a pressure normally in the range of 5 to 20 p.s.i., which when exerted upon the catcher member renders it effective in cooperating with the shear bed to reduce the speed of movement of any rough-cut blank material sliding thereunder.

Pressurized air also leaves the main air manifold 702 through the line 459 and is conveyed to the solenoid operated valve 709 associated with the scrap gate 409 (see FIGURE 25). When it is necessary to pivotally open the scrap gate so as to allow for the free fall of any trimmed scrap downwardly into the depository 410, the solenoid valve, which is a common four way variety, is energized to provide for the direct passage of pressurized air through line 710 and into the proximate end of the cylinder 415 while exhausting air from the opposite end thereof, for effecting the pivotal opening operation of the scrap gate. When it is necessary to close the scrap gate, as during the routine sheet cutting or splitting operations, the solenoid valve may be de-energized and direct pressurized air through the line 711 and into the opposite end of cyclinder 415, while exhausting air from the end proximate valve 709, thereby causing a pivoting and closure of said scrap gate.

Air line 460 attaches to the main air manifold 702 and conveys a portion of the pneumatic air pressure to an air regulator 461. Although the pressure of the air conveyed within the line 460 is approximately 80 p.s.i., the air regulator 461 is adjusted so that the air pressure may be reduced to approximately 5 to 10 p.s.i., and then conveyed through line 712 to the solenoid operated valve 723 of the speed reducing sensor 324 (see FIGURE 3). When the common two-way solenoid operated valve 723 has been electrically energized, the reduced pressurized air is permitted to pass through said valve and through line 329 to the cylinder 325 and thereby force and maintain the arcuate plate 330 of the speed reducing sensor at its most forward position. When the leading edge of the blank material advances toward the back gauge, it contacts the plate 330 with sufficient force so as to overcome this reduced air pressure and force the cylinder rod 326 rearward into the engagement with the electric switch 334 to effectuate a lessening of the speed of movement of the blank.

Connected to the main air manifold 702 is a line 462 which conveys pressurized air to the common solenoid operated four-way valve 394 of the blank material striker 701 (see FIGURE 27). When it is necessary to disengage any blank material that may magnetically adhere to the holders 355, the solenoid operated valve is electrically energized and directs pressurized air through line 463 and into the upper portion of the cylinder 391, while exhausting air from the opposite end thereof, thereby effecting a lowering of the striker. After the striker has been completely lowered and functioned to detach the blank, it may be elevated by de-energization of the solenoid 394 which allows the passage of air through its valve and into line 464 for conveyance to the lower end of cylinder 391, while simultaneously exhausting air from the top end thereof, to effect a raising of the striker 701.

Pressurized air is conveyed from the main air manifold 702 through the line 465. A portion of the air passing through line 465 is directed into line 198 for conveyance to the air operative motor 195 which assists in the lateral shifting of the rough-cut blanks toward the straight edge 208 (see FIGURES 2, 13, and 15). The air in the line 198 passes to a lubricator 197 and through a line 199 to a common solenoid operated four-way valve 200. When it is desired to elevate the air motor 195, the solenoid operated valve 200 is electrically actuated and provides for the passage of air through line 201 and into the lower portion of the air cylinder 202, while exhausting air from its upper portion through line 207. The pressurized air acts within the cylinder to cause an elevating of the air motor 195. Concurrently, part of the pressurized air passing through the line 201 enters line 205 and is conducted to the air motor to provide for a rotation of the wheel 196 that is rotatably mounted upon said motor. The air motor 195 is elevated and its wheel rotated as the blank material is deposited upon the delivery table 1 by the transferring device T, and assists in the lateral shifting of said blanks. When it is necessary to lower the air motor so as to withdraw it from use, the solenoid operated valve is de-energized and directs pressurized air through the line 207 and into the upward portion of the cylinder 202, not only precluding any further passage of pressurized air through the line 201, but additionally opening it to atmosphere for the purpose of exhausting its retained air.

The air functions within the cylinder 202 to lower the air motor 195 and render it inactive.

The remaining pressurized air passing through line 465 is conducted to the junction 466 (see FIGURE 2). Part of the air passes into an air line 467 and is conveyed to various of the air operative components that are mounted upon the delivery assembly D (see FIGURE 4). A line 468 connects to the line 467 and conducts air through an air line 469 to the common solenoid operated three-way valve 160. When the solenoid is electrically energized, the valve provides for the passage of air through line 159 to the single acting spring return cylinder 153 that is mounted upon the pusher member 132 (see FIGURE 7). The pressurized air acts within the aforementioned cylinder to extend the pusher member a fixed distance ahead of the remaining pusher members of the delivery assembly. The extension of the pusher member is eliminated by a de-energization of the solenoid 160 which closes off its integral valve and thereby provides for an exhausting of air within the spring loaded cylinder 153 and effects a retraction of the pusher member 132.

Air line 719 connects with line 468 and conveys the pressurized air to the common solenoid operated three-way valve 47 which is affixed to one end of the delivery assembly main air cylinder 42. When the solenoid valve is periodically energized, it provides for passage of the air into the proximate end of said cylinder which functions to return the delivery assembly to the forward end of the delivery table away from the shear at the completion of the cutting of a blank material. During this process, the pressurized air contained in the opposite end of cylinder 42 is exhausted to atmosphere.

An air line 470 connects with line 468 and conveys pressurized air to the solenoid operated valve 131, as seen in FIGURES 2 and 5. When the solenoid 131 is electrically energized, air is passed through its valve, which is a common three-way type valve, and into the air line 130 for conveyance to the cylinder 124 of the pusher member 109 (see FIGURE 8). When air is directed in the foregoing manner to said pusher member, it provides for a pivoting in the gripper 117 until it engages the lagging edge of the blank B. It is necessary that the back edge of the blank material be held tightly to the pusher member during the cutting and final trimming operation so as to control movement of the blank at all times, and further, to prevent the final trim scrap from swinging past the shear blades and bypass the opened scrap gate. After the final trim cut has been effected, the solenoid operated valve 131 is denergized and exhausts the pressurized air, and the spring 126 biases the gripper 117 to disengage the blank material so as to allow for the remaining piece of trimmed scrap to uniformly fall off the shear bed through the opened scrap gate and into the depository 410.

Pressurized air is further conveyed through line 468 until it connects with air line 714. The air conveyed through line 714 passes to an air line 715 that is common to the solenoid operated valves 77 and 79 that attach radially to the speed regulating oil filled cylinder 74 of the delivery assembly D (see FIGURE 11). When the solenoid 77 is electrically energized, such as when the blank material advances into proximity of the shear S or back gauge 311, the pressurized air of line 715 forces the valve to meter the flow of oil within the cylinder 74 and thereby reduce the speed of advancement of the delivery assembly D. Additionally, when the solenoid valve 79 is electrically energized, the pressurized air within the line 715 forces the valve into closure and thereby prevents any further flow of oil within the cylinder 74 and immediately curtails any further movement of the delivery assembly D. This solenoid operated valve 79 acts in conjunction with the oil filled cylinder 74 to immediately stop the movement of the delivery assembly D at selective moments such as when the blank material is to be cut.

The remaining pressurized air conveyed through the line 468 is conducted to the common solenoid operated three-way valve 80 which when electrically energized provides for the passage of air through line 83 to the air brake 84 to render it operative (see FIGURE 12). When the pressurized air is allowed to act upon the air brake 84, the delivery assembly is immediately stopped and prevented in its further movement, such as during the shear cutting operation, or upon return of the delivery assembly from the shear. It should be noted that the solenoid operated air valve 80 is energized simultaneously with the actuation of the solenoid operated valve 79 so that the advancing movement of the delivery assembly is stopped by the dual action of the air brake 84 and the curtailing of the flow of oil within the cylinder 74.

Connected to the junction 466 in the air line 465 is a line 471 which conducts pressurized air to the junction 472 of an air line 473 (see FIGURE 3). The air passing through line 473 is maintained at the house air pressure, or 80 p.s.i., and part of said air is conducted through an air regulator 474 wherein it is reduced in pressure down to approximately 40 p.s.i. This reduced pressurized air is conveyed through line 475 to a lubricator 476 and further passes through a line 477 to the solenoid operated three-way valve 46 (see FIGURES 2 and 4). When the solenoid valve 46 is electrically energized, the pressurized air is allowed to pass into the proximate end of the cylinder 42 and act therein to provide for the lateral linear shifting of the shaft 48 and its integral rack 49 which resultingly effectuates the advancement of the delivery assembly toward the shear. While the delivery assembly moves toward the shear, the reduced pressurized air conveyed through line 477 continually passes into the cylinder 42, even though at select moments the air brake and the oil cylinder 74 may operate to provide for a momentary stoppage in the advancement of said delivery assembly toward the shear S.

The remaining portion of the pressurized air passing through line 473 is conducted into the air regulator 478 wherein it is reduced from house air pressure down to a pressure of approximately 40 p.s.i. This reduced pressurized air then passes through the air line 162 and into the solenoid operated valve 163 of the lateral feed F (see FIGURE 13). When the solenoid valve is electrically energized, the pressurized air is allowed to pass into the proximate end of the cylinder 161 and therein laterally shift the rack 165 to provide for a rotation of the sprocket wheel 172 and movement of the endless continuous link chain 173. A function of the lateral feed F in this manner provides for a shifting of the rough-cut blanks across the delivery table and into engagement with the straight edge 208 just after said blanks have been deposited upon the table 1 by the transferring device T. To return the lateral feed F to its normally inactive position, the solenoid valve is deenergized, exhausting air from the proximate end of the cylinder 161, while providing for passage of the pressurized air through line 705 to the opposite end of the cylinder 161 to retract the rack 165. In this manner the sprocket wheel 172 and the link chain 173 turn in the reverse direction.

Connected to air line 471 is another line 194 which conveys pressurized air to the solenoid operated valve 193, as may be seen in FIGURES 3 and 13. Valve 193, a common three-way valve, passes air into the cylinder 190 when its integral solenoid has been electrically energized. With pressurized air released into the cylinder, said cylinder causes the lateral feed center stop to be pivoted upwardly onto the shear bed and in alignment with the transverse slideway 181 and thereupon prevent movement of the slide member 176 beyond the center of the delivery table. To retract the lateral feed center stop 183 to prevent its use, the solenoid valve 193 may again be electrically de-energized providing for an exhausting of the pressurized air contained within the cylinder 190, and the cylinder, being spring loaded, is biased for pivotal retraction of the center stop into an inoperative position below the level of the shear bed.

Connected to air line 471 is a line 724 which attaches to a manually operated valve 725, which is associated with the stacker assembly 24 of the shearing apparatus. (See FIGURE 26.) When it is desired to elevate the back gate 424 and other components of said stacker, pressurized air is released through the valve 725 and into the air line 726 for conveyance to the lower portion of the cylinder 428, thereby effecting a raising of the cylinder rod and the connected back gate. Likewise, when it is necessary to lower the back gate when such is necessitated to acquire a proper stacking of the cut blank material, the valve 725 may be manually adjusted to provide for conveyance of pressurized air through line 727 and into the upper portion of the cylinder 428, while simultaneously exhausting the air from its lower portion, for effecting a downward extension of the cylinder rod and back gate. This adjustment of the back gate and other components of the stacker is necessary so that it may be maintained at a proper height just adjacently rearward of the conveyor C so as to properly collect the blank material as they uniformly fall off the conveyor.

Connected to the main air manifold 702 is an air line 479 which conducts pressurized air to a lubricator 266 and through line 260 to the prehold-downs. (See FIGURE 15.) The air conveyed in line 260 is transferred into the solenoid operated four-way valve 261, which when electrically energized passes the pressurized air into lines 262 and 263 for release respectively into the upper portions of the cylinders 256 and 257 for effecting an immediate lowering of the prehold-downs and their binding of the blank material firmly upon the shear bed 25. After the shear ram 19 has completed its downward stroke and cut the blank, the solenoid is de-energized and provides for the exhaust of air from the upward portions of the cylinders while simultaneously passing the pressurized air through lines 264 and 265 into the lower sections of said cylinders to raise the prehold-downs.

Attaching to the main air manifold 702 is an air line 232 which conveys air under pressure to an air valve 231 that normally restrains further passage of the air, but when periodically acted upon by a time control valve 233 provides for passage of the air through line 230 and into the cylinder 228 (see FIGURE 15). When the pressurized air is released into the cylinder 228, the downwardly directed force produced by this cylinder overcomes the substantially lesser downward force exerted by means of the cylinder 224 upon the catcher member, and thereby effects a raising of the catcher member so as to relieve the pressure contact between it and the shear bed. A limited amount of pressurized air passing through line 232 is conveyed by line 235 to the solenoid operated two-way valve 234, which when electrically energized passes the air into the time control valve 233 to effect its operation. An air line 236 conveys a portion of the air emitted by the valve 231 to an air manifold 238 which directs jets of air under pressure proximate the area of the stationary shear blade 213 to assist in the removal of any remaining piece of scrap material that may be left at the end of the cutting operation.

It is to be noted that the rough-cut blank transferring device T uses vacuum air pressure as a means for holding the blank as it transfers it to the shearing apparatus. The vacuum pump 716 when energized and running produces a vacuum through the series of interconnecting lines 717 that creates a suction at each terminal cup 718, and provides a means for holding the blanks during transfer. Naturally, when it is necessary to deposit a blank of material onto the shear bed, a valve integral in the pump construction is opened to allow for atmospheric pressure to develop within lines 717 and cups 718 to curtail their further vacuum hold.

Figure 30:
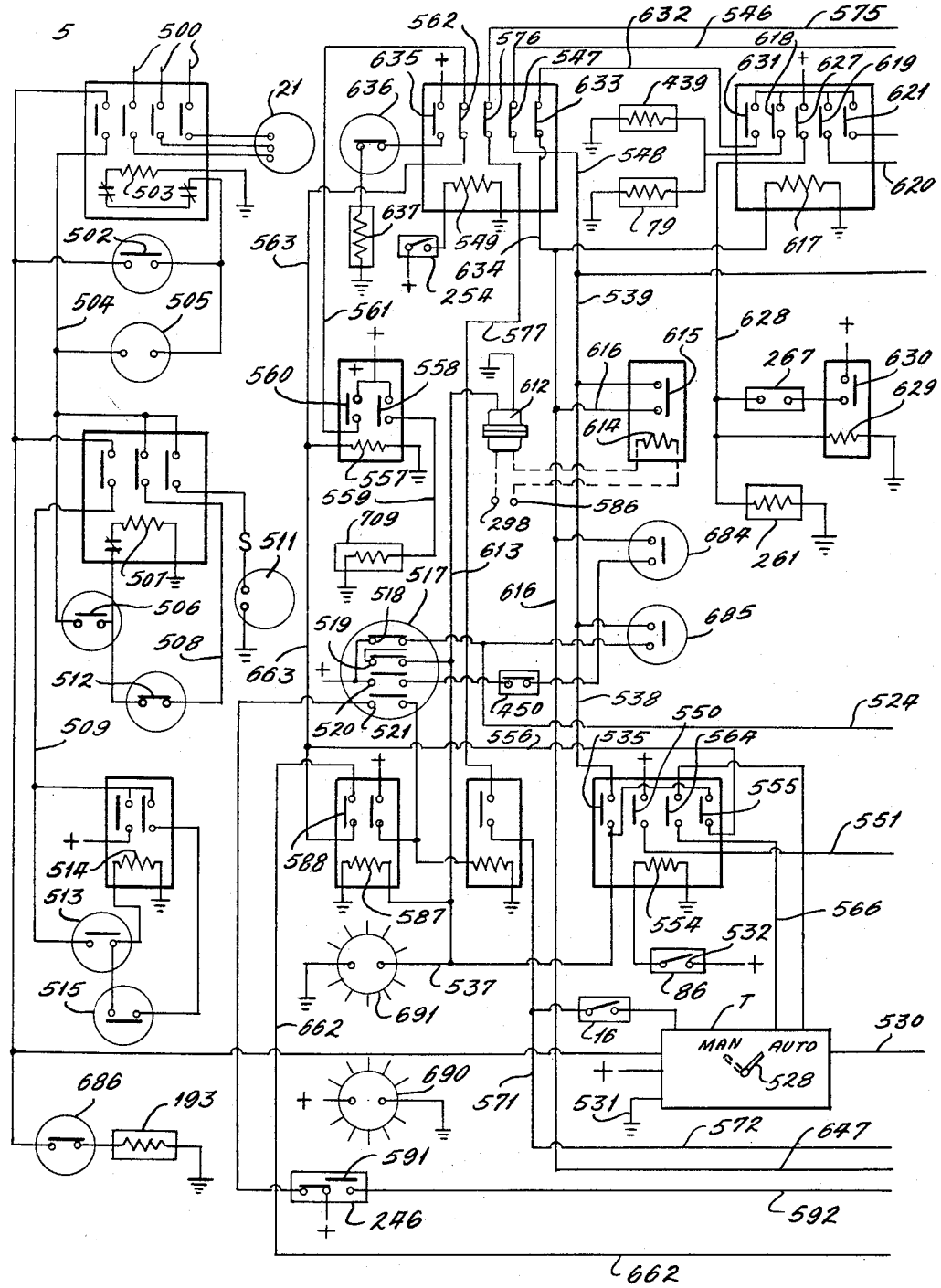
FIGURE 30 is a partial schematic diagram of the electrical circuitry and components employed in the operation of the shear and adjunct apparatus.
Figure 30A:
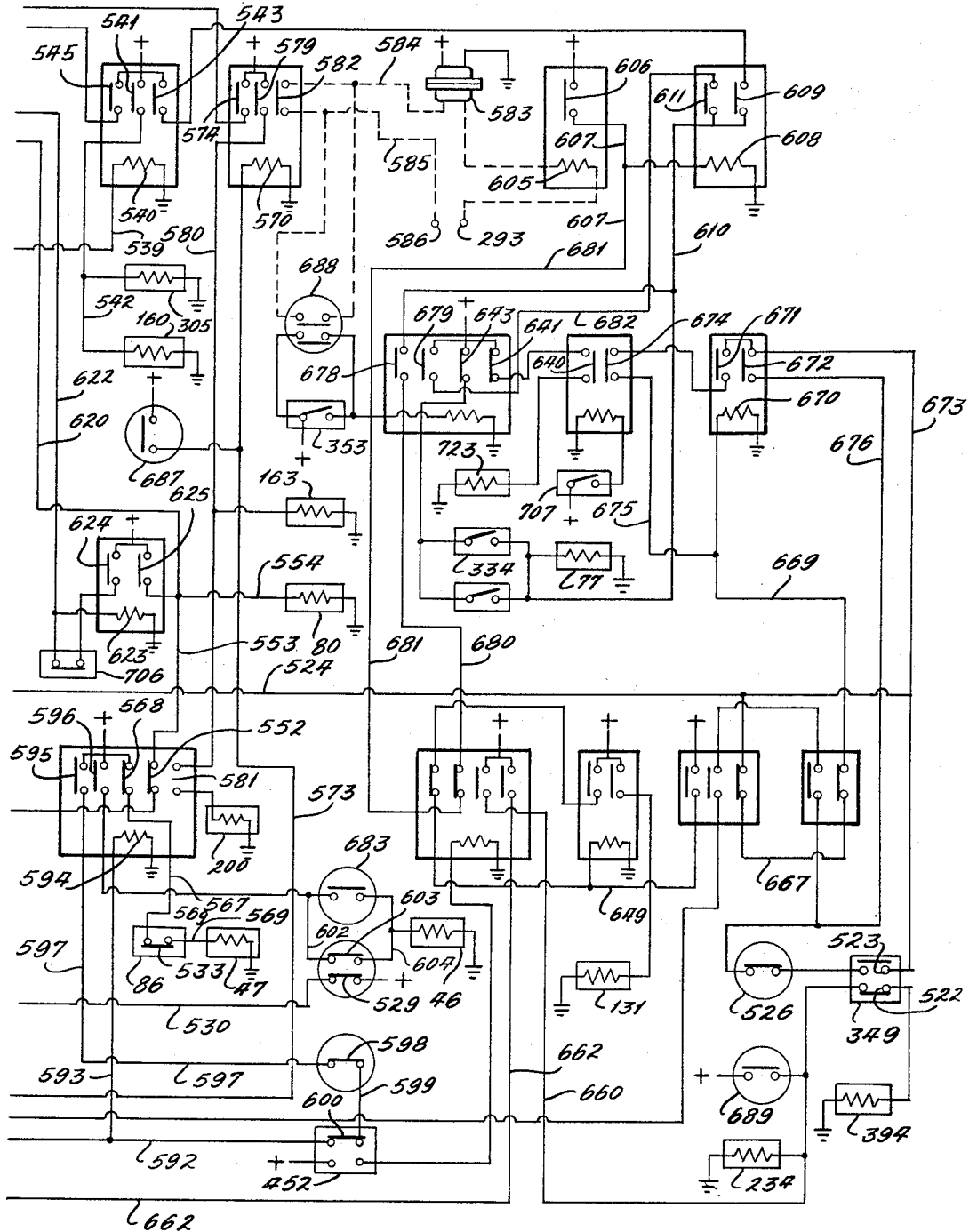
FIGURE 30a, is the complementary part of the schematic diagram of the electrical circuitry disclosed in FIGURE 30.

The operation and cooperation of the various electrical, pneumatic, and mechanical devices involved in the apparatus will be more clearly understood by reference to, and explanation of, the electrical wiring diagrams shown in FIGURES 30 and 30A, it being understood that FIGURES 30 and 30A are, respectively, lefthand and righthand parts of the same wiring diagram, and hence are to be read together.

Regardless of whether the shearing apparatus is to be operated in a "trim sequence" or a "split sequence," to make widely spread cuts or to make narrowly spaced cuts, certain preliminary conditions are required to activate the electrical circuitry delineated in FIGURES 30 and 30A. It will be observed that the power and control systems are shown as being energized, in part, by three-phase power, and in part by single-phase power, but it will be understood that such is optional. In the form shown in the drawing, three-phase alternating current, such as 220-volt, is supplied through lines 500 for energizing shear motor 21. Otherwise, the circuitry shown in FIGURES 30 and 30A is supplied with single-phase, 110-volt, alternating current through line 501, with portions stepped down to a lower voltage, such as 24 volts.

In order to pre-condition the controls for operation in accordance with any one of the aforementioned sequences, the first step is to close the control circuit by depressing push-button 502, which completes a circuit between line 501 through normally closed overload switch contacts connected in series circuit relation with a relay coil 503, and thence to ground. The relay coil 503, when energized, operates a four-pole relay, as indicated diagrammatically, to close the three-phase circuit (including the current-sensitive members of the aforesaid overload switches) between lines 500 and motor 21, and simultaneously to close a circuit from line 501 to conductor 504, which energizes instrumentalities later to be described. Connected by the conductor 504 through a normally closed switch 505, there is a holding circuit for relay coil 503, so that once switch 502 is closed and the relay has energized conductor 504, switch 502 may be opened without affecting any circuit. Switch 505, may, however, be manually actuated to its open circuit position in order to de-energize all of the automatic control circuits, and to de-energize all of the power circuits, except that leading to the transfer device T which takes its power voltage, but not its control voltage, directly from conductor 501.

Next in the sequence necessary to initiate operation of the apparatus is the movement of switch 506 to its closed circuit position. Closing of switch 506 completes a circuit from conductor 504 through normally closed overload switch contacts and relay coil 507 to ground. Energization of coil 507 operates a three-pole relay to its closed circuit position, thereby energizing a control circuit through conductor 508, and a control circuit main 509, and also energizing power circuit 510 (which includes the current-sensitive element of an overload switch), to operate conveyor motor 511. The control circuit 508 is a holding circuit for relay coil 507, and is under the control of a normally closed switch 512, which may be manually actuated to open the relay associated with coil 507. Control main 509 extends to a normally open, manually operable switch 513, which controls the flow of power to relay coil 514. A two-pole relay is associated with coil 514, which, when the coil is energized, is moved into a position at which a circuit is completed from main 509 to a terminal marked +, and another circuit is completed through normally closed switch 515, which is a holding circuit for coil 514. Terminals marked + appear at numerous positions in the drawings, and each terminal at which + appears is connected to a control circuit main which originates at the terminal marked + associated with relay coil 514.

Switch 515 may be manually moved to its open circuit position, with the result that all automatic control circuits are thereby de-energized.

Since the control circuits illustrated permit either automatic operation or manually controlled operation, the next step in conditioning the apparatus for automatic operation is to assure that manually operated switch 516 is in its normally closed position, and that switch 517 is positioned in accordance with the type of cutting to be performed. If the shear is to operate on a trim sequence, switch 517 is positioned to close the circuits at poles 518 and 519, whereas if a split sequence is to be followed, switch 517 is operated to open the circuit at poles 518 and 519, and close the circuits at poles 520 and 521. Hence, the switch 517 selectively energizes the control circuits for operating the shear in a trim sequence, or energizes the circuits for operating the shear in a split sequence, as desired. In the condition shown in the drawings, switch 517 is set for a trim sequence, and the immediately following description will concern the operations which occur in a trim sequence on a repeat-action basis for the shear.

When poles 518 and 519 of switch 517 are closed, a circuit is completed which energizes coil 587 of a subjacent relay, which closes normally open contacts 588 and 589. The circuit established by closing pole 589 energizes coil 590 of an adjacent relay which in turn closes pole 578 to complete (at that point) holding circuits for various relays later to be described.

Depending upon whether it is desired to operate the shear on a repeat-action basis, or on a once-action basis, switch 349 (FIGURE 30A) assumes and maintains one of two positions, depending upon the position of back gauge 311. In the position shown in the drawings, switch 349 is shown with its pole 522 in closed circuit position and its pole 523 in open circuit position, which is the position for once-action basis, and it will be understood that for operating the shear on a repeat-action basis as now to be described, switch 349 will be closed at pole 523 and open at pole 522. Thus, with pole 523 closed, a circuit is completed from pole 518 of switch 517 through conductor 524, conductor 525, normally closed, manually operable switch 526, to pole 527 of target sensor 337. Pole 527 of target sensor 337 is shown in the drawings in open circuit position, and it will be understod that said sensor is closed at pole 527 only when that target sensor is actuated by the leading edge of a blank of sheet material about to be cut.

Assuming the transfer device T to be in the position shown in FIGURE 1, with its vacuum pump 716 in operation and its individual, manually operable control 528 in the position indicated at square T in FIGURE 30 which effects automatic operation of the transfer device, a circuit is completed through pole 529 of switch 516, conductor 530, through the control system of the transfer device to ground at 531. Such energization of the control system of the transfer device T energizes it to:

(1) Lift an individual blank B from the supply pile;
(2) Transfer that blank to a position over table 1, and preferably toward the side thereof at which straight edge 208 is located, where the transfer device pauses momentarily with the blank suspended;
(3) Assuming the delivery assembly D to be at the front of table 1 as shown in FIGURE 1, the transfer device T will lower the suspended blank onto the table 1.

When the delivery assembly D is in the position shown in FIGURE 1, pole 532 of switch 86 is in its closed circuit position, and pole 533 is in its open circuit position, which is the reverse of the normal condition of switch 86 at poles 532 and 533, as shown in the drawing. Movement of the poles of switch 86 out of the normal position shown in the drawings is effected by movement of delivery mechanism D from a position near the shear S to the position remote therefrom, i.e., at the front end of table 1, as shown in FIGURE 1. As previously described, switch 86, which embraces poles 532 and 533, in manually adjustable lengthwise of rails 26 in accordance with the magnitude of the blank to be handled, and consequently it will be understood that only when switch 86 is at its extreme position away from the shear S will it be necessary to move delivery assembly D as far toward the front of table 1 as shown in FIGURE 1. Otherwise, if switch 86 has been moved, say, to a position halfway between the front end of the table and the shear, it will not be necessary for the delivery assembly D to move away from the shear any farther than merely to pass switch 86 before actuating it.

If, however, at the time the transfer device T pauses with the blank suspended above the table, delivery mechanism D has not actuated switch 86 so that poles 532 and 533 stand in their normal position shown in FIGURES 30 and 30A, the delivery mechanism D must first be retracted past switch 86.

Instantaneously with the tripping of switch 86 out of the position shown in the drawings at 532 and 533, a variety of other circuit controlling devices is activated concurrently with the deposit by transfer device T of a blank B upon the table 1.

The control devices thus concurrently activated are as follows:

(1) When, in its movement, the delivery mechanism D moves switch 86 to open pole 533 and interrupts a circuit through conductor 567 and normally closed poles 568 to +, and through a conductor 569 to a solenoid valve 47 which, when open, supplies air to main feed cylinder 42, which motivates delivery assembly D in its movement away from shear S. Accordingly, when pole 533 of switch 86 is closed, the delivery assembly D is in motion in the direction away from the shear S.

Figures 22, 23:
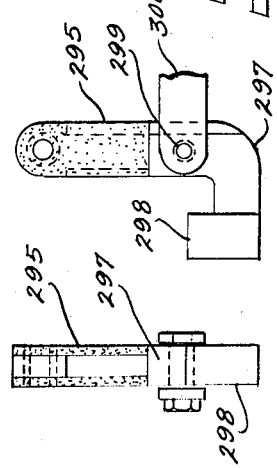
FIGURE 22 is a detail front view of the trim sensor.
FIGURE 23 is a detail side view of the trim sensor revealed in FIGURE 22.

(2) Closing pole 532 energizes coil 534 of a four-pole relay, moving all four poles into circuit closing position which:

(a) At pole 535, closes a circuit from pole 519 of switch 517 through conductor 536, conductor 537, through poles 535 and conductor 538, conductor 539, to coil 540 of a three-pole relay which is normally open circuit at all poles. In its closed position, pole 541 completes a circuit through conductor 542 and the coil of solenoid valve 305 to open the valve. Concurrently, the coil of solenoid valve 160 is energized and moved to open position. As previously described, valve 305 supplies air to trim sensor cylinder 302 to lower the trim sensor plate 298 into operative position, as shown in FIGURE 23, and as previously described, solenoid valve 160 supplies air to cylinder 153 of the extendible pusher member shown in FIGURE 7. With the energization of coil 540, pole 543 closes a circuit through conductors 544 for a purpose later to be described. Simultaneously, pole 545 closes a circuit through conductor 546, through a set of normally closed contacts 547 on a relay later to be described, thence through conductor 548 to conductor 539, to establish a holding circuit for coil 540. Thus, the energization of coil 540 is dependent upon energization of coil 534, and held energized by the de-energized condition of coil 549 later to be described.

(b) Energization of coil 534 also moves normally open pole 550 into a closed circuit position, thereby completing a circuit through conductor 551, normally closed relay pole 552, conductor 553, and conductor 554, to solenoid valve 80 which, when opened, supplies compressed air to brake 84 to stop the movement of delivery mechanism D in the direction away from shear S when it trips switch 86. Solenoid valve 80 is also energizable by other means to be later described.

(c) Energization of coil 534 also establishes a circuit through pole 555 from pole 519 of switch 517, conductor 536, conductor 537, and to conductor 556, to coil 557 which, when energized, operates a two-pole, normally open relay into closed circuit position, thereby to complete a circuit through pole 558 and conductor 559, to a solenoid valve 709 which, when opened, supplies operating air to scrap gate air cylinder 415.

Simultaneously with the energization of coil 557, pole 560, through conductors 561, normally closed pole 562, and conductor 563 which constitutes a holding circuit for coil 557. Hence, the energization of coil 557 at this stage of the sequence of operation depends, as in the case of coil 540, upon the energization of relay coil 534, and is held by the de-energized condition of relay coil 549. Another method of energizing coil 557 will be subsequently described.

(d) Finally, the energization of relay coil 534 completes a circuit through pole 564 and conductor 566 to the individual conductors of the transfer device T to effect lowering of the suspended sheet and deposit of the latter upon table 1. In the process of depositing the blank upon the table, the transfer device T is automatically controlled by its internal arrangements to release the vacuum which suspends the blank as the blank is being lowered and is within a few inches from the table 1; thence to automatically return the elevator of the transfer device to its upper position; thence to traverse the transfer device T to a position above the stock pile; and finally to lower its elevator itno position, make a vacuum engagement with a succeeding blank, elevate that blank, and transverse it to a position above table 1, as previously, where the transfer device T pauses until the delivery assembly D has completed its movement toward shear S and returned to trip switch 86.

Switch 16, as hereinbefore described, is located adjacent the path of traversing movement of transfer device T. Switch 16 is actuated into closed circuit position by movement of transfer device T toward the position at which it deposits a blank upon the table 1; and remains in closed circuit position until the transfer device T has, in the course of its return stroke, released switch 16 into open circuit position. While switch 16 is closed, it receives no power until the internal controls of the transfer device T have sensed the return of the elevator of the transfer device to its upper position. Thereupon, a circuit is completed within the internal controls of the transfer device T to supply power to switch 16. When supplied with such power, switch 16 energizes relay coil 570 by completing a circuit through conductor 571, 572, and 573, to the relay coil. Energization of coil 570 actuates a three-pole relay from its all-pole, normally open position as shown, to complete:

(1) Through pole 574, conductor 575, pole 576 of another relay, conductor 577, and now closed pole 578, to conductor 571, 572, and 573, to complete a holding circuit to relay coil 570.

(2) Through pole 579 to complete a circuit through conductor 580, to solenoid valve 163 which, when open, supplies air power to the lateral feed cylinder 161, as shown in FIGURE 13; and also through normally closed pole 581 of another relay to energize solenoid valve 200 which, when open, supplies air to actuate cylinder 202 and operate air motor 195, as shown in FIGURE 15; and (3) Through pole 582 to complete one leg of a 24-volt A.C. circuit from the secondary of transformer 583 through conductor 584, and conductor 585, to a terminal 586, electrically connected with the bed 25 of the shear S.

As the blank on the table is moved laterally by the agencies previously described, under catcher 209, and against straight edge 208, the then laterally leading edge of the blank actuates switch 246 to close a circuit through normally closed contacts 598 of a manually controlled and 593 to energize coil 594 of a five-pole relay, and to move poles 595 and 596 into circuit closing position. The former completes a circuit through conductor 597 through normally closed contacts 598 of a manually controlled switch, and thence through conductor 599 to a pole 600 of switch 452 (which is mechanically actuated by the advance of the delivery assembly D when the latter reaches the end of its stroke nearest the shear). While in closed position, pole 600 completes a circuit through conductor 592 and conductor 593 to constitute a holding circuit for coil 594. The aforesaid switch 598 is a manually operable switch which is normally spring biased into circuit closing position, but may be opened as when it is desired to effect an immediate return of the delivery assembly D during any stage of its advancement toward the shear.

The closing of pole 596 completes a circuit through conductor 601 and 602 to normally closed contact 603 of manually controlled switch 516, and thence through conductor 604 to the coil of solenoid valve 46 which, when energized, admits operating air to cylinder 42 which motivates delivery assembly D toward the shear S, as shown in FIGURES 4 and 5.

Concurrently with the closing of poles 595 and 596, poles 568, 552 and 581, which are normally in closed circuit relation, are open. The opening of pole 568 interrupts the flow of current (also controlled by switch 86) to solenoid valve 47, energization of which supplies pressurized air to cylinder 42 in a direction such as to move the delivery assembly toward the position shown in FIGURE 4. Energization of coil 594 also interrupts the circuit through pole 552 which, when closed, energizes solenoid valve 80 to apply the air brake 84. Likewise, energization of coil 594 interrupts the circuit completed by pole 581 to solenoid valve 200, thereby to shut off the air to, and exhaust the air from, cylinder 202, and cut off the supply of air to air motor 195.

Thus, the energization of relay coil 594 deactivates the instrumentalities which (1) have moved the delivery assembly D to the position shown in FIGURE 4; (2) have applied the brake 84; and (3) have activated the crossfeed booster motor 195 shown in FIGURE 15. Simultaneously with such de-activation, circuits are activated which (1) permit energization of instrumentalities which move the delivery assembly D toward the shear; and (2) establish a holding circuit to hold poles 595 and 596 in circuit closed position and poles 568, 552 and 581 in open circuit position. As the delivery mechanism D moves toward the shear, switch 86 has its poles 532 and 533 restored to the position shown in the drawing, which de-energizes coil 534 and permits the poles 535, 550, 564, and 555 to reassume the open circuit position shown in the drawing.

As the delivery assembly D moves toward the shear under the impulse of air supplied through valve 46, and engages a blank upon the shear table, the blank is moved into contact with probe 293 a couple of inches ahead of the stationary blade 213 thereby completing a 24-volt, electrical circuit through the shear bed to terminal 586. The completion of such circuit energizes coil 605 to close normally open contact 606, and thereby to complete a circuit through conductor 607 to relay coil 608. This closes pole 609, and completes a circuit from the closed poles of 543, through conductor 544 and 610 to solenoid valve 77 which, when energized, retards the flow of oil from one side of the piston within cylinder 74 to the other side thereof, thereby reducing the velocity of the movement of delivery assembly D toward the blade. Such reduction of the velocity of the delivery assembly occurs when the leading edge of the blank is a fraction of an inch (e.g., a quarter inch) distant from engagement with trim sensor plate 298 (which, when engaged by the leading edge of the blank, completes a 24-volt, electrical circuit from the shear bed).

Energization of coil 608 also moves pole 611 into circuit closing position, which, under circumstances later to be described, completes a holding circuit for coil 608, but such holding circuit is not completed under the conditions of operation now being described.

Having thus retarded the movement of the delivery assembly toward the shear blade, such movement proceeds at the lessened velocity until the leading edge of the blank contacts plate 298. The last-mentioned 24-volt, electrical circuit has its source in transformer 612, the primary of which is energized through conductor 613, which is controlled by pole 519 of the manually operable switch previously described, wherein pole 519 is normally closed when set for the trim sequence. The secondary of transformer 612 is connected to energize coil 614 when the leading edge of a blank in electrical contact with the shear bed engages said plate 298. The transformer 612 may be connected to the shear bed at the same point 586 as that at which the secondary of transformer 583 is connected, or at different points if desired. Such 24-volt energization of coil 614 moves relay pole 615 into circuit closing position to energize the instrumentalities which move the movable shear blade through a single cycle of operation, and also instrumentalities which perform sequential operations later to be described. Movement of the shear is initiated when the circuit through pole 615 is completed from conductor 539, through conductor 616, to relay coil 617, whereby a circuit is established through pole 618 to energize solenoid valves 439 and 79. Solenoid valve 439, when energized, opens a valve which controls the flow of air to cylinder 438 to engage the clutch which mechanically interconnects shear motor 22 with the shear ram 19. Energization of solenoid valve 79 interrupts the flow of oil from one side of the piston within cylinder 74 to the other side thereof, and therefore stops the movement of delivery assembly D toward the shear blades.

Simultaneously, agencies are activated to hold the blank accurately in position true with the shear blade, so that the cut made by the blade will be at the desired angle to straight edge 208. Among the agencies which so hold the blank are the air brake 84 and the two prehold-down cylinders 256 and 257. To apply the air brake 84, pole 619, when closed, completes a circuit through conductor 620 to solenoid valve 80. Simultaneously, with the energizing of relay coil 617, pole 621 completes a circuit through conductor 622 to coil 623, closing normally open poles 624 and 625. The latter completes a parallel circuit to solenoid valve 80. The former completes a holding circuit for coil 623 through normally closed air brake release switch 706. Switch 706 is momentarily actuated into open circuit position during the return (i.e., upward) stroke of the movable shear blade.

Likewise, energization of coil 617 moves pole 627 into closed circuit position which in turn actuates the prehold-down devices (see FIGURE 15) into firm engagement, clamping the blank against the shearbed. This circuit extends through conductor 628 to solenoid valve 261, which, when energized, admits pressurized air to the cylinders which operate the prehold-downs. Simultaneously, relay coil 629 is energized to move a normally open pole 630 into circuit closing position through a normally closed prehold-down release switch 267, thereby to maintain the energization of solenoid valve 261 after the circuit has been broken at pole 627. The prehold-down release switch 267 is actuated into its open circuit position by movement of the shear blade in its return (i.e., upward) stroke.

The remaining pole 631 on the relay actuated by coil 617 completes a holding circuit for said coil through conductor 632, normally closed pole 633 of the relay energized by coil 549 and conductor 634.

When the clutch between the shear motor 22 and the shear ram 29 becomes engaged as above described, shear hold-down bar 20 is also actuated in a downward stroke, leading the movement of the shear ram so that the hold-down members 248 engage the blank before the movable shear blade engages it, and continue to hold it until after the shear blade has started its return stroke. During the downward stroke of the shear ram, and after the springs 253 associated with one of the hold-down plungers 248 has undergone some compression so as to bring the rod 250 into the dotted line position shown in FIGURE 19, switch 254 is moved into its closed circuit position where it completes a circuit through relay coil 549, previously described, which moves normally closed relay poles 562, 576, 547 and 633 out of their circuit closing position as shown, and simultaneously completes, through pole 635, a circuit through a normally closed switch 636 to a solenoid coil 637, which operates a counter. Switch 636 is a manually operated normally closed switch which when opened prevents the counter 637 from registering a cut of the shear. Switch 254 resumes its open circuit position during the upward stroke of shear blade 20, whereupon the poles controlled by relay coil 549 resume their respective open and closed circuit positions as shown. While coil 549 remains energized, however, the following relay coils are de-energized: 557, 570, 605, 608, 540, and 617. Also, on the return stroke of the shear blade, switch 267 momentarily opens to de-energize relay coil 629 and solenoid valve 261 which controls the prehold-downs. Also on the up-stroke of the shear ram, switch 706 is momentarily moved into its open circuit position, to de-energize relay coil 623 and air solenoid 80 which controls the braking mechanism 84.

Thus during the return (i.e., upward) stroke of the shear blade, the clutch between the shear motor and the shear ram, together with the hold-down bar 20, has been disengaged, the trim sensor plate 298 has been retracted to the position shown on FIGURE 16, the extendible pusher 132 has been retracted into alignment with the other pusher members, the scrap gate 409 has been closed, the cross-feed mechanism F has been returned to a position remote from straight edge 208, the solenoid valve 77 is opened to permit free flow of oil from one side of the piston within cylinder 74 to the other side thereof, the oil valve 79 has been opened, and the prehold-downs and air brake 84 have been released. The last-two-mentioned operations have been completed during the return stroke of the shear ram. When that ram reaches the top of its stroke, normally open switch 707 is moved into its closed circuit position, thereby energizing relay coil 639 of a two-pole relay, and moving pole 640 from its normally open to its closed position to complete a circuit from normally closed pole 641 of another relay to solenoid valve 723, which, when energized, opens a valve controlling the flow of air from a regulator, not shown, to an air line 329 for supplying cylinder 325 with air at pressure (e.g., 10 p.s.i.) lower than the air pressure on the other devices described. This results in moving plate 330 to a position forward of vertical member 313 of back gauge 311, as, for example, about two inches. In fact, the position of sensor plate 330 ahead of the back gauge is its normal position, except where it is desired to make successive cuts which are spaced apart a distance less than the distance which plate 330 is normally disposed ahead of back gauge 311. The other pole 674 of the relay containing coil 639 will be subsequently described.

Upon de-energization of the various instrumentalities as described at the beginning of the preceding paragraph, the delivery assembly D immediately moves at high velocity toward the shear, forcing the leading edge of the blank, which has just been trim cut, toward back gauge 311. When the leading edge of the blank engages sensor plate 330, further movement of the blank in the same direction moves switch 334 from its normally open to its closed position, completing a circuit through normally closed pole 643 and conductor 644, which energizes solenoid valve 77 to close the associated oil valve and reduce the speed of the delivery assembly D. It is to be noted that upon the downward stroke of the shear ram the switch 707 is opened effecting a de-energization of relay coil 639 and associated solenoid valve 723 for a fixed time until the shear ram once again returns upwardly after a cut. This functions to prevent the plate 330 from prematurely returning forward and detrimentally buckling or entrapping the cut piece of the blank B. Hence, the delivery assembly proceeds at slow speed until the leading edge thereof engages target sensors 336 and 337. It will be observed that pole 645 of target sensor 337 is connected in series circuit relationship with normally open pole 646 of target switch 336, so that both target switches have to be actuated by the leading edge of a blank before a circuit is completed from conductors 524 and 525 through switches 349 and 526, and conductors 347 and 346 to conductor 647, which leads to conductor 616, and energizes relay coil 617 to initiate a new cycle of operation as described above in connection with the trim cut. The series connection of the two target sensors assures that the shear will not operate when the leading edge of the blank is in position to engage but one of the target sensors. However, when target sensor 336 is actuated by the leading edge of a blank, it completes a circuit through pole 648, through conductor 649, to relay coil 650. Energization of coil 650 moves poles 651 and 652 of that relay from their normally open to their closed circuit position, thereby completing a circuit to solenoid valve 131, which, when energized, opens a valve to supply air to operate the gripper 117 on pusher member 109, and causes the latter to grip the blank near its trailing edge to stabilize the blank during its movement. Simultaneously, through pole 652, coil 650 establishes a holding circuit for itself through conductor 653 and normally closed contacts 654 of another relay. Thus, gripper 117 remains in active engagement with the blank in spite of the fact that the target sensor is open after the shear has completed its stroke and severed a piece from the blank, which thereupon falls out of engagement with the target sensors and onto the conveyor C.

The sequence of mechanical and electrical operations then repeat themselves to cut all successive pieces of the same dimensions as the first (after the trim cut), until the delivery assembly has moved toward the shear pushing out the remaining trimmed scrap, to a position where the leading corner of support 36 engages an operator for normally open switch 451, which is in parallel with switch 334, to close a circuit therethrough, which energizes solenoid 77 to reduce the speed of the delivery assembly before the pusher members strike the stationary blade 213. The slower speed movement of the delivery assembly D continues until it advances a fraction of an inch farther toward the shear until support 36 engages the operator of switch 452. Switch 452 has a normally closed set of contacts 609, and a normally open set of contacts 655. Upon engagement by bar 36, contacts 655 are closed to energize relay coil 656, thereby opening the circuits at poles 654 and 657, and closing circuits at poles 658 and 659. The opening of the circuit through poles 654 de-energizes relay coil 650 and de-energizes solenoid valve 131, thereby releasing gripper 117. The closure of pole 658 completes a circuit through conductor 660 to solenoid valve 234 to set in motion a timer valve 233 which subsequently lifts catcher 209, and supplies air to manifold 238 for emitting jets of air against the residual scrap piece after the last regular cut. The switch 349 is a limit switch which disconnects conductor 661 and solenoid 394 under circumstances where the distance between one cut and the next is so small that back gauge 311 would be in the path of striker 701. Under the operating conditions above, where the shear is being operated on a repeat basis, cutting pieces whose dimension between successive cuts is so short that the back gauge 311 must be positioned so close to the shear blades that operation of striker 701 would be interfered with by the back gauge, switch 349 is in a position opposite that shown, so that the circuit through it is closed at pole 523, but open at pole 522. Preferably, switch 349 is arranged to be actuated by movement of the back gauge, so that when the back gauge is sufficiently distant from the shear blade to permit operation of the striker, the switch 349 assumes the position shown, but when the back gauge is closer to the shear blade, the poles of switch 349 are in the opposite relationship to that shown. Energization of coil 656 also closes a circuit at pole 659, through conductor 662, to pole 588 (now closed by virtue of the energization of coil 587 through operation of switch 517 initially), and conductor 663, to coil 557 of the scrap gate operating relay, thereby to open the scrap gate. Once coil 557 has been energized through conductor 663, the closing of pole 560 establishes a holding circuit through conductor 561, normally closed contacts 562, and conductor 563, so that the scrap gate remains open after the delivery assembly D has retracted from the position at which it actuated switch 452, and until, on the next succeeding blank, a cut has been made which closed switch 254 and energized coil 549 to open the holding circuit for coil 557 at pole 562. When bar 36 of the assembly D actuates switch 452, pole 600 thereof is moved into open circuit position, thereby de-energizing coil 594, which, among other things, interrupts the supply of air to motivate the delivery assembly D toward the shear, and opens valve 47 to cause the delivery assembly to move away from the shear readily to repeat the sequence of another blank. Additionally, during the occurrence of the foregoing, various other circuitry is completed so as to prepare for the functioning of the air brake 84 upon return of the delivery assembly to the forward end of table 1. Also, the circuitry of the transfer device T and the air motor 195 is completed to provide for their immediate operation for the next cycle of operation of the shearing apparatus A.

In contrast with the series of operations above described with reference to a trim sequence carried out on a repeat basis of the shear, the following description has reference to a trim sequence carried out on a once-action basis of the shear. In order to pre-condition the electrical circuits for operation on a once-action basis, where the back gauge is disposed with reference to the shear blade at a distance sufficient to permit, or to require, operation of the striker 701, the first step is to position switch 349 as shown in FIGURE 30A, where pole 523 is in open circuit position and pole 522 is in closed circuit position, to complete (at that point) a circuit to the solenoid valve 394 which controls operation of the striker 701.

In order to initiate the once-action operation, the apparatus must be further pre-conditioned in two respects: the target sensors 336 and 337 must be in the position shown in FIGURE 30A, where their normally open contacts 645, 646, and 648 are open and their normally closed contacts 666 and 668 are closed to complete a control circuit; and a control switch 707 (which is normally actuated upon the upward movement of the shear ram after each cut of the shear is completed) must be in circuit closing position. When thus pre-conditioned, the apparatus will operate the shear through a single cycle when a piece of stock to be sheared engages the target sensors 336 and 337 and moves them into the position at which the normally open contacts 645 and 646 are closed.

It will be observed that when the target sensors are in their normal position, i.e., when not engaged by the leading edge of the blank being cut, a circuit is completed from line 524, through conductor 665, through the normally closed contacts 666 of target sensor 336, conductor 667, to the normally closed contact 668 of target sensor 337, and thence through conductor 669 to the relay coil 670. Energization of coil 670 moves the poles 671 and 672 into their circuit closing position, thereby admitting power from conductor 524 through conductor 673 to the respective poles 671 and 672, and completing from the former a circuit to pole 674 of the relay energized by coil 639, but when coil 639 is not energized, the circuit through pole 671 is then open. However, switch 707 which is in its circuit closing position whenever the shear ram is at the top of its stroke, energizes coil 639 to close a circuit between pole 674 and a conductor 675, which completes a holding circuit for coil 670. Another circuit completed upon energization of coil 670 involves closing pole 672 to connect with conductor 676, which is interrupted at pole 645 of target sensor 337, save when the leading edge of a blank is in engagement with the target sensor. However, in the normal sequence of operations, coil 670 is energized when the target sensors are both in their normal position, and is held energized (as by pole 674 if relay coil 639 is energized by switch 707) after the circuit is broken at pole 668, but instantaneously after the interruption of the circuit at pole 668, a circuit is made at pole 645 of target sensor 337 to establish a circuit through conductor 676 to pole 527 (now closed), and thence to pole 646 of target sensor 336, which, if now closed, completes a circuit to conductor 647 to energize relay coil 617. Thus, in the once-action basis of operation, movement of the target sensor is ineffective to activate the shear unless the movable shear blade is at top dead center. Manually controlled once-action operation can be accomplished by operation of switch 526 into its open circuit position, even when pole 523 of switch 349 is in its closed circuit position. The latter is sometimes desirable when the length of the pieces being cut is such that they do not readily release themselves from the magnetic sheet holders during the period of time which elapses between shear strokes.

Under circumstances where the distance between successive cuts of the same blank is not substantially greater than the stroke of sensor plate 330, switch 353 is actuated into its closed circuit position by movement of the back gauge 311 toward the shear blades, thereby to energize relay coil 677, and consequently interrupt the circuits through normally closed poles 643 and 641, but to complete circuits through poles 678 and 679 which are normally open. The former prepares a holding circuit for relay coil 608 through conductor 680, normally closed contact 657 and conductor 681. This will keep solenoid valve 77 energized and closed once relay coil 608 is initially energized by pole 606 of relay coil 605 which, in turn, is energized by the continuity created when the leading edge of the blank B completes a circuit between point 586 on the shear bed and probe 293 of switch 285 to reduce the velocity of delivery assembly D. The power for the holding circuit just described is supplied through pole 679 to conductor 682, through now closed pole 611 and conductor 610 to pole 578. Thus, once a blank has been advanced to a position where contact is made with probe 293, coil 608 is energized and remains energized even after probe 293 has been energized by the breaking of contact at pole 582, which occurs when the first cut is made on a blank, in the course of which switch 254 is moved into closed circuit position, thereby interrupting the holding circuit for coil 570 by the separation of contacts 576 which are normally closed. After the de-energization of probe 293, however, coil 608 remains energized by virtue of the holding circuit through conductor 682, 610, 680, and 681, as above described. Thus, the holding circuit is complete as long as relay coil 656 is de-energized, which condition remains until support 36 of the delivery assembly D trips switch 452.

When, as aforesaid, the back gauge 311 is disposed closer to the shear blades than the length of the stroke of plate 330, switch 353 is closed, energizing coil 677 and, breaking the circuit through pole 643, interrupts the enerergization of conductor 644, and consequently removes solenoid valve 77 from control by switch 334 and 451, but simultaneously subjects solenoid valve 77 to energization through now closed pole 679, conductor 682, pole 611, and conductor 610, to maintain the slower speed movement of delivery assembly D until support 36 actuates switch 452. Once delivery assembly D has returned to a position beyond switch 86, it is ready to advance toward the shear upon the deposit of a new blank on the table at the higher velocity until it hits probe 293 of switch 285.

Again, in making successive cuts shorter than the stroke of sensor plate 330, it is desirable to maintain solenoid valve 723 de-energized, so that plate 330 will not be projected into its normal position. This is accomplished by breaking the circuit to solenoid valve 723 at pole 641, which is in its open circuit position, while coil 677 remains energized.

Such de-activation of solenoid 723 occurs on all operations where successive cuts are spaced apart a distance less than the stroke of plate 330, regardless of whether a trim sequence or a split sequence is being utilized.

However, when successive cuts are being made which are more distant from each other than the stroke of sensor plate 330, energization of solenoid 723 can only be energized when the shear ram has reached the top of its stroke and closed switch 707 to energize coil 639.

To adapt the apparatus for carrying out a split sequence where the dimensions of the blank are an exact multiple of the dimensions of the pieces to be cut, so that there is no initial trim and no residual scrap: the scrap gate 409 never opens; the instrumentalities which were active in the trim sequence only on the first cut are deactivated; the instrumentalities which were active only on the last cut are de-activated and the lateral feed devices are de-activated immediately after the then (sidewise) leading edge makes contact with switch 246, as distinguished from being maintained in action until after the trim cut is made. Accordingly, to adapt the apparatus for split sequence operation, switch 517 is moved into the position where poles 518 and 519 thereof are in open circuit position, while poles 520 and 521 are in closed circuit position. This prevents energization of coils 540, 557 and 587, and prevents energization of solenoid 709. Transformer 612 is never energized in the split sequence.

However, in the split sequence, certain instrumentalities come into play which were not previously utilized or where used in a different manner. Among these are: switch 246, switch 450, and probe 293 of switch 285.

The closure of the circuit at pole 521 of switch 517 directly energizes relay coil 590, thus closing pole 578 independently of the energization of coil 587, as in the trim sequence. Relay coil 590 is, however, under the control of switch 246 at the straight edge 208, so that when the sidewise leading edge of a blank actuates switch 246, coil 590 is de-energized. Such de-energization of coil 590, albeit only momentary, interrupts the circuit through pole 578. The thus interrupted circuit begins at pole 574, extends through conductor 575, pole 576, conductor 577, pole 578, conductor 571, 572, 573, and coil 570, and is a holding circuit for the last-mentioned coils and the relay poles associated with them, including pole 574. That holding circuit is established upon initial energization of coil 570 by virtue of the closing of switch 16 by the blank transfer mechanism T. Whereas with the trim sequence, the last-mentioned holding circuit was interrupted by the energization of coil 549 and the subsequent separation of the contacts at pole 576, in the split sequence that holding circuit is interrupted at pole 578 before coil 549 is energized to separate the contacts at pole 576. Hence, once that holding circuit is broken at pole 578, relay coil 570 cannot be energized again by subsequent contact between the sidewise leading edge of a blank and switch 246, unless switch 16 is in its closed circuit position, which can only occur on a subsequent cycle of the transfer mechanism T. This sequence of operations results in the lateral feed F returning to its retracted position immediately upon moving a new blank into contact with the straight edge. Further functioning of the air motor 195 ceases and it is retracted for inoperation under the surface of the delivery table similarly as it did when the shearing apparatus was adjusted for the trim sequence of operation. The consequence of this operation is to preclude the shear from making a cut at or near the leading edge of the blank as the blank approaches the shear by de-activating those instrumentalities which cause such to be done on the trim sequence.

Where a split sequence is being employed on cuts which are spaced apart a sufficient distance that allows for a functioning of the speed reducing sensor 324, probe 293 of switch 285 is never active to reduce the speed of delivery assembly D. The conductor 585 which is charged and connects as at 586 with the shear bed is momentarily contained in closed circuitry through the closure of pole 582 by energization of coil 570, and thus prepares the probe 293 for energization as the blank laterally approaches the straight edge 208 and switch 246, but upon contacting switch 246, the coil 570 is de-energized as previously described and pole 582 interrupts the circuitry through legs 584–586 of the secondary in transformer 583. Accordingly, the retardation of the velocity of delivery assembly D is accomplished solely through the agency of the leading edge of the blank actuating sensor plate 330.

In the split sequence, after the number of cuts has been made which leaves but one pattern size portion remaining on the shear bed, support 36 of the delivery assembly D actuates switch 450 into its open circuit position, thereby interrupting the circuit through target sensors 336 and 337, so that the shear does not fire when the last remaining pattern size increment of the blank contacts the target sensors. But, at this stage of the operation it is necessary that striker 701 be functioned to disengage any of the blank material from the magnetic holders 355.

Frequently at start-up, it is desirable to make a single cut, then to check for accuracy on one or more succeeding cuts with appropriate intervening adjustments if necessary. This trial operation, called "jogging," is accomplished by manual manipulation of switch 516 selectively from closed to open positions. Such jogging is applicable to all types of cutting sequences. In this connection, switch 683 is provided so that, by momentary manual operation, the delivery assembly D may be advanced short distances, halted, and advanced another short distance.

In addition to the instrumentalities which operate as aforesaid, and as shown in the drawing, to produce the several different sequences of automatic operation, the control system involves certain manually operable controls which have not been mentioned hereinbefore. Among these is manually operable switch 684, which is springbiased to its open circuit position. This switch is so connected in the circuitry that, when closed, it completes a circuit energizing instrumentalities which cause the movable shear blade to make one complete cycle and then stop. Manually operable switch 685 is likewise spring-biased to open circuit position, but may be manually closed when it is desired, as sometimes occurs when a new or different setting has been made, or a different sequence is embarked upon, to activate the several instrumentalities which perform the functions peculiar to the trim cut, i.e., the first cut made on a blank in the trim sequence. These devices include trim extension pusher 132, trim sensor 294, and scrap gate 409.

Switch 686 is manually operable between positions which either close the circuit (as shown) or cause it to remain open. Switch 686 is not spring-biased in either position at which it is set. When in the closed circuit position shown in FIGURE 30, solenoid valve 193 is energized from main 501. This admits operating air to cylinder 190, which moves a center stop 183 into the path of slide member 176, whereby to arrest movement of the member in the direction away from straight edge 208 at a position approximately halfway across table 1. When blanks having a lateral dimension less than half the width of table 1 are being operated upon, it is a waste of time to permit the lateral feed device F to operate through an amplitude such that slide member 176 is arrested by abutment 180 at the far side of the table. Accordingly, under such circumstances, switch 686 is moved into the closed circuit position to arrest the return movement of said member 176 half-way across the table, and thereby reduce the amplitude of its movement.

When and if it is desired, as during a test or trial, to actuate the entire shearing mechanism through one complete cycle of operation, and then to stop it, such may be accomplished by manually closing normally open switch 687.

Manually operable switch 688 is a two-pole switch wherein both poles are either in circuit closing position or in circuit interrupting position; and the switch may be set to either open or closed position optionally. Switch 688 has its respective poles wired into the 24-volt and 110-volt control circuits so that movement of switch 688 into its circuit closing position performs the function above described of both pole 582 (in the lateral feed relay energized by coil 570) and also the function of switch 353 (which is actuated into circuit closing position when the back gauge 311 approaches closer to the shear blades than the length of the stroke of sensor plate 330) in the course of operation hereinbefore described. Thus, when switch 688 has its poles in closed circuit position, the delivery mechanism is constantly under the control of probe 293, and hence cannot operate at high velocity.

Finally, there is a manually operable switch 689, which is spring-biased into open circuit position, but may be manually closed at will to energize solenoid valve 394, and with each energization of that valve, the striker 701 is actuated through its downward stroke. Opening switch 689 permits the striker to resume its upper position, and repeated operation of switch 689 accomplishes a succession of blows by the striker on a sheet of metal which may be hung on the magnetic holders 355. Such operation of the striker by switch 689 is, however, under control of switch 349, and hence cannot take place if the back gauge 311 is at the time located so close to the shear blades that it would interfere with operation of the striker.

FIGURE 30 also illustrates the provision of desirable visual signals consisting of a red light 690, which is illuminated automatically with the energization of relay coil 514 to energize the control circuits at large. A green light 691 is conencted to signal that switch 517 is set in the position for "trim sequence", and signal lamp 691 is energized by the movement of pole 519 into the position shown, and remains energized as long as pole 519 remains in the position shown, i.e., as long as switch 517 remains in the trim sequence position.

Manually operable switch 526 is a two-position switch which remains in either circuit closing or circuit interrupting position as desired. No current flows through switch 526 (even though its contacts be closed) unless switch 349 has had its pole 523 moved into circuit closing position. The latter occurs only when back gauge 311 is moved into a position at which it interferes with the operation of striker 701. In that state of affairs, the shear normally operates on a repeat action basis as previously described, but when, for some presently unknown reason, it may become necessary, under the same set of conditions, to operate the shear on a once-action basis, manipulation of switch 526 into its open circuit position permits the shear ram to make one complete cycle of operation and stop.

The foregoing accurately describes in detail the configuration and cooperation of the various mechanisms incorporated into the composite shearing apparatus of this invention. Additionally, the operations of the various pneumatic and electrical systems which provide the essential energy for uniform functioning of the shearing apparatus are accurately revealed in their methodical arrangement for inducing the selective actuation of the various parts of said shearing apparatus. Hence, when the apparatus has been properly assembled and readied for use for rapidly shearing blank material, the blanks may be automatically systematically squared and cut along its leading and lagging edges with a precision that has not yet heretofore been acquired by any conventional shear in the metal working art. Likewise, when it is desired to acquire a precisely cut blank of sheet material that has been properly aligned and squared along all of its sides, the cut blank material that had previously been processed by the shearing apparatus and sheared along its leading and trailing edges, may be subsequently restacked and arranged for delivery to the shearing apparatus and be cut along its two remaining sides, again totally automatically by the shearing apparatus. Thus, as revealed, this shearing apparatus is highly efficient in usage, without sacrificing any accuracy while cutting blank material to precise dimensions.

It is to be understood that the above described invention is simply illustrative, and that numerous other arrangements may be readily devised by those skilled in the art which will embody the principles of the invention and be included within its spirit and scope thereof.

Having thus described the invention, what is claimed and desired to be secured by Letters Patent is:

1. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, said delivery means including a pusher assembly astride said table, means mounting said pusher assembly for traversing movement toward and away from said shear blades, said pusher assembly having a plurality of pusher members each having an end addressed toward said blades and extending in part above and in part below the level of the upper surface of said table, said pusher members being spaced from and substantially aligned with each other in the direction transverse to said traversing movement, and said pusher members each being resiliently mounted for limited movement relative to each other in the direction of said traversing movement.

2. The combination of claim 1 wherein one of said pusher members has selectively operable means independent of its resilient mounting for forcibly advancing it ahead of other pusher members in the direction toward said shear blades.

3. The combination of claim 1 wherein one of said pusher members has selectively operable means at said end for gripping a blank thereadjacent.

4. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, a back gauge at the opposite side of said shear blades from said table, means for adjusting the distance between said back gauge and said shear blades, said sensor means being mounted on said back gauge and having on the shear blade side thereof a plurality of targets spaced apart in the direction parallel with the shear blades and substantially aligned with the surface of said table, a normally open electric switch associated with each target, said switches being electrically connected in series circuit relationship and arranged to be closed upon engagement of their respective targets by the leading edge of a blank being operated upon, whereby the sensor means is operative to initiate a shear stroke only when both targets have been engaged by a blank.

5. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, a back gauge defining said predetermined position, additional sensor means normally disposed substantially in front of said back gauge but behind said shear blades and aligned with the top surface of said table, said additional sensor means having an amplitude of movement, in the direction perpendicular to the shear blades, sufficient to enable it to retract into alignment with said back gauge, a normally open electric switch arranged to be closed upon initial movement of said additional sensor means toward alignment with said back gauge, said delivery means including a pusher member which is forcibly extensible in the direction toward said back gauge, and said electric switch controlling an electrical circuit which when said switch is closed causes extension of said extensible pusher member.

6. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, a trim sensor mounted for selective movement into and out of operative position in alignment with the top surface of said table close to but spaced from said stationary blade, and means operative upon engagement of a blank with said trim sensor when in operative position to initiate movement of said movable shear blade.

7. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, a straight edge at one side of said table, said straight edge being disposed in predetermined angular relationship with said shear blades and so located with reference thereto that projection of the straight edge intersects the movable shear blade when in shearing position, said delivery means including means for urging a blank on said table against said straight edge, and a catcher adjacent said straight edge and arranged to overlie a portion of a blank on said table adjacent said straight edge, and selectively operable means for biasing said catcher against a blank therebeneath to retard movement of the blank relative thereto.

8. An apparatus for shearing blanks of sheet material comprising in combination a shear having a stationary blade, a movable blade, a table in front of said sheer blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, and transporting means operable between said table and a nearby supply of blanks to pick up an individual blank from said supply, transport it to, and deposit it upon said table.

9. The combination of claim 8 wherein said transporting means is actuated to deposit a blank upon said table when said delivery means has released a preceding blank.

10. The combination of claim 7 wherein said catcher has a blank-contacting liner formed of material softer than the blank material and having a greater coefficient of friction with the blank material than does steel.

11. The combination of claim 7 and further characterized by said catcher being pivotally mounted to said straight edge, and means for selectively elevating said catcher for relieving its pressure bias upon the blank.

12. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movemnet of said movable blade toward and past said stationary blade, and holding means disposed proximately rearward of the shear blades and being normally aligned in the plane of the table, said holding means provided for supporting the blank as it advances beyond said blades.

13. The combination of claim 12 having a striker means normally provided upwardly from the supported blank and selectively operative for descending downward below the blank for detaching its retention by the holding means.

14. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, and a deflecting means disposed in fixed relationship with the movable blade and depending downwardly for extension below the plane of the table while the shear is at rest, said deflecting means provided for diverting downward the remanent trim of the blank material.

15. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, conveyor means for transferring sheared blanks of material away from the shear, stacker means disposed adjacent the end of the conveyor means remote from said shear and providing for uniform collection of said blanks, and a scrap gate pivotally mounted to the conveyor and adjacent to the shear, said scrap gate being selectively pivotally opened for passage therethrough of remanent trim cut by the shear, and said scrap gate being selectively pivotally closed for directing transfer of the sheared blanks to the conveyor means.

16. An apparatus for shearing blanks of sheet material comprising in combination a shear having a stationary blade, a movable blade, a table in front of said shear blades, delivery means operative in response to the deposit of a blank upon said table to angularly orient the blank relative to said blades and to advance the blank on said table toward and in part beyond said blades, sensor means operative in response to the arrival of the blank at a predetermined position beyond said blades to initiate movement of said movable blade toward and past said stationary blade, conveyor means for transferring sheared blanks of material away from the shear, stacker means disposed adjacent the end of the conveyor means remote from said shear and providing for uniform collection of said blanks, a deflecting means disposed in fixed relationship with the movable blade and depending downwardly for extension below the plane of the table while the shear is at rest, and a scrap gate pivotally mounted to the conveyor end adjacent to the shear, said scrap gate being selectively pivotally opened for passage of remanent trim cut by the shear and diverted by said deflecting means, and said scrap gate being pivotally closed for directing transfer of the sheared blanks to the conveyor means.

17. The combination with a shear having a bed extending horizontally in front of shear blades, of a plurality of substantially spaced minuscule ribs on the upper surface of said bed, said ribs having a height above said bed not substantially exceeding that sufficient to admit a layer of air between a flat sheet resting on the ribs and the subjacent surface of the bed and said ribs being rounded on their surface remote from said subjacent surface.

18. The combination of claim 6 having a bed extending horizontally in front of said stationary shear blade, a switch means mounted to said bed and in close proximity forwardly of said blade but for a distance necessary to provide upon its actuation when contacted by an advancing blank for a reduction in the speed of movement of the delivery means prior to the engagement of the blank with the trim sensor.

References Cited
UNITED STATES PATENTS

| | | | |
|---|---|---|---|
| 1,907,903 | 5/1933 | Valiquette | 83—418 |
| 2,196,684 | 4/1940 | Rodder et al. | 83—211 X |
| 2,269,714 | 1/1942 | Fenton | 83—212 |
| 2,327,103 | 8/1943 | Gude | 83—94 |
| 2,766,825 | 10/1956 | Pater et al. | 83—390 X |

JAMES M. MEISTER, *Primary Examiner*.